(12) United States Patent
Cooper et al.

(10) Patent No.: US 11,822,574 B2
(45) Date of Patent: Nov. 21, 2023

(54) SYSTEM AND METHOD FOR PROVIDING AN ARTIFICIALLY-INTELLIGENT GRAPH DATABASE

(71) Applicant: Graphen, Inc., New York, NY (US)

(72) Inventors: Hal J. Cooper, New York, NY (US); Ching-Yung Lin, Scarsdale, NY (US); Danny Lo-Tien Yeh, Tarrytown, NY (US); Matthieu L. Gavaudan, New York, NY (US)

(73) Assignee: Graphen, Inc., New York, NY (US)

( * ) Notice: Subject to any disclaimer, the term of this patent is extended or adjusted under 35 U.S.C. 154(b) by 674 days.

(21) Appl. No.: 16/593,478

(22) Filed: Oct. 4, 2019

(65) Prior Publication Data

US 2020/0110761 A1 Apr. 9, 2020

Related U.S. Application Data

(60) Provisional application No. 62/741,399, filed on Oct. 4, 2018.

(51) Int. Cl.
*G06F 16/28* (2019.01)
*G06F 16/2455* (2019.01)
*G06F 16/22* (2019.01)

(52) U.S. Cl.
CPC .......... *G06F 16/28* (2019.01); *G06F 16/2272* (2019.01); *G06F 16/24568* (2019.01)

(58) Field of Classification Search
CPC . G06F 16/28; G06F 16/2272; G06F 16/24568
See application file for complete search history.

(56) References Cited

U.S. PATENT DOCUMENTS

| | | | | |
|---|---|---|---|---|
| 6,094,649 A | * | 7/2000 | Bowen | G06F 16/951 707/999.005 |
| 8,775,476 B2 | * | 7/2014 | Henderson | G06F 16/9024 707/798 |

(Continued)

OTHER PUBLICATIONS

World Intellectual Property Organization, "International Search Report and Written Opinion," issued in International Application Serial No. PCT/US2019/054738 dated Jan. 7, 2020, document of 10 pages.

*Primary Examiner* — Grace Park
(74) *Attorney, Agent, or Firm* — Akerman LLP; Ryan Harding

(57) ABSTRACT

A system for providing an artificially-intelligent graph database is disclosed. The graph database has significant graph computing capabilities, which are facilitated through the integration of artificial intelligence into the graph database. The capabilities are enabled through the use of unique artificially-intelligent agents that are each responsible for a subgraph of a graph of the graph database. Each artificially-intelligent agent performs computations on the graph-structured data in each subgraph that each agent is responsible for managing. The artificially-intelligent agents may work cohesively together to provide artificial intelligence capabilities to the entire graph database. The graph database may optimize itself through intelligent local management by using the agents. Notably, the graph database may optimize and manage itself with respect to previous interactions, such as requests for data, changes to data, and algorithm execution, as well with respect to future interactions associated with the graph database, while modifying management as time progresses.

19 Claims, 18 Drawing Sheets

(56) References Cited

U.S. PATENT DOCUMENTS

2012/0151000 A1\* 6/2012 Snodgrass .............. H04L 43/08
709/217
2016/0219066 A1\* 7/2016 Vasseur .............. H04L 63/1458
2018/0089331 A1\* 3/2018 Long .................. G06F 16/2455

\* cited by examiner

SYSTEM AND METHOD FOR PROVIDING AN ARTIFICIALLY-INTELLIGENT GRAPH DATABASE

CROSS REFERENCE TO RELATED APPLICATIONS

This application claims priority to and claims the benefit of U.S. provisional patent application No. 62/741,399, filed on Oct. 4, 2018, the disclosure of which is incorporated herein by reference in its entirety.

FIELD OF THE INVENTION

The present application relates to computing technologies, graph database technologies, machine learning technologies, software optimization technologies, and more particularly, to a system and method for providing an artificially-intelligent graph database.

BACKGROUND

In today's technologically-driven society, users and businesses are increasingly relying on computing systems to facilitate and provide various types of services. As the reliance on computing systems has increased, so has the need for high quality databases and artificial intelligence facilitating the operating of such databases. Currently, distributed computing is often utilized to solve artificial intelligence and machine learning problems where datasets are too large to store on a single computer or when no single computer is capable of solving a desired problem in a reasonable timeframe. Additionally, there exist graph computing systems which are primarily used for the purpose of performing a computation on a graph, and there exist graph databases, which are instead focused on the storage, ingestion, and retrieval of graph-structured data. Notably, existing graph databases are often limited in their ability to perform computations on a graph of interest. While there exist a few graph databases that have some computational ability, such graph databases are nevertheless deficient in terms of desired capability and operative functionality.

In existing systems, top-level management of a graph database typically necessitates affecting the entire graph database in a global fashion. For example, all sections of a graph may be required to be stored in a same storage format, even though the storage format may be ideal for only certain portions of the overall graph of the graph database. As another example, when making updates to the graph, existing technologies require locking access to the entire database, such as to satisfy the ACID consistency model. This is the case because when an entire graph database is stored in the same place, stored in the same format, and viewed at a macro-level, a very small change (such as, but not limited to, the addition of an edge to the graph database) may mean shifting and/or modifying all structural data of the graph database. As yet a further example, if one desires to execute a specific algorithm on new transactions entered into existing graph databases, such existing graph database technologies may block the graph database from executing other algorithms and functionality at the same time. External (macro-level) management is used in existing graph databases because it is often easier than micro-managing every part of an enormous database. Such macro-level management often results in a loss of efficiency and requires more manual oversight of the database itself. On the other end of the scale, if every component of a graph has its own individual management (e.g. TigerGraph or other similar technologies), then one cannot take advantage of the commonalities in the data stored in the graph or the relational structure of the graph.

Based on the foregoing, current graph database technologies and processes may be modified and improved so as to provide enhanced functionality and features. Such enhancements and improvements may effectively decrease the effort required to manage graph database, while simultaneously improving the accuracy and functionality of graph databases. Additionally, such enhancements and improvements may provide for optimized database request processing, improved fraud detection capabilities, increased autonomy, improved interactions with users and/or devices, improved user satisfaction, increased efficiencies, increased access to meaningful data, substantially-improved decision-making abilities, increased ease-of-use, and/or simplified or reduced maintenance. Furthermore, such enhancements and improvements may reduce processor usage, memory usage, network bandwidth usage, and/or other computing resources. Moreover, such enhancements and improvements may be improved and optimized over time through the use of artificial intelligence and/or machine learning.

SUMMARY

A system and accompanying methods for providing an artificially-intelligent graph database are disclosed. In particular, the system and methods implement a distributed computing methodology that may fall under the field of distributed graph computing, such as by creating an artificially-intelligent graph database. Notably, the system and accompanying methods may be utilized to provide a graph database that utilizes artificial intelligence to internally (micro-)manage and arrange graph data and algorithm execution based upon prior and forecasted usage patterns. By having artificial intelligence inside the graph database, the system and methods facilitate a plethora of features that are not feasible with traditional graph databases. Such features include, but are not limited to, the increased ability to run graph algorithms in parallel without having to block or pause regular graph database functionality, and the ability to execute algorithms and changes to a graph database dynamically in response to learned and user-specified triggers.

The graph database provided according to the system and methods has significant graph computing capabilities facilitated by the integration of artificial intelligence into the graph database itself. These artificially-intelligent capabilities of the graph database may be enabled by a unique "router abstraction," where a router in the present disclosure may refer to an artificially-intelligent agent that may be responsible for a small sub-section of the graph-structured data (i.e. a subgraph). Each artificially intelligent "router" may perform computations on the subset of graph structured data it contains, and by communicating with the other artificially-intelligent routers (hence the use of the term "router"). In certain embodiments, multiple artificially-intelligent routers may work cohesively together to provide artificial-intelligence capabilities to the entire graph database.

The graph database according to the present disclosure is the first graph database to be able to optimize itself through intelligent local management. The intelligent local management may be facilitated by having the artificially-intelligent agents each optimizing their corresponding subgraph of responsibility. By using the artificially-intelligent router abstraction, the system and methods provide a comfortable middle-ground that lacks the weaknesses of traditional and/or existing approaches. For instance, each agent's artificial-intelligence can select a storage format that best matches the local connective structure (e.g. the relational structure of the subgraph contained within each given agent/router) without having to apply that format to the entire graph (where it may be a poor overall choice). Notably, it is by having artificially-intelligent agents (i.e. routers) that operate concurrently (which can communicate with each other when necessary) with each managing small sections of the overall graph that the system and methods facilitate and accomplish overall graph management. This allows the artificially-intelligent agents to manage the graph in a manner that would be impossibly complex for an individual top-level management algorithm. For instance, existing graph databases often lock access to the entire database during updates to meet the ACID consistency model. This is because when an entire graph database is stored in the same place in the same format and viewed at a macro-level, a very small change (such as the addition of a single edge) could mean shifting and/or modifying all structural data. By contrast, the system and methods need only lock the associated router.

Furthermore, the functionality provided by the system and methods allows the artificially-intelligent agents to dynamically and concurrently respond to changing conditions in the graph database. For instance, an artificially-intelligent agent (i.e. router AI) can be instructed (or can learn) to run particular graph algorithms under certain conditions. Consider, for instance, a graph database of financial transactions tasked with detecting fraudulent transactions and suspected money laundering. Individual artificially-intelligent agents can be charged with dynamically running fraud detection algorithms related to newly added financial transactions as they are added to the graph database. By having the artificially-intelligent agents concurrently executing these algorithms on-the-fly, the graph database can run such algorithms when required as determined by the artificial intelligence. This is contrasted with existing graph databases, where such fraud detection algorithms might be manually set to run once a week over the entire graph during a period when new transactions are not occurring, both because existing graph databases do not track which transactions are new, and because running the fraud detection algorithm could block the graph database from executing other algorithms and functionality at the same time (due to the lack of the concurrent execution capability facilitated by the artificially-intelligent agents).

Artificially-intelligent management of a graph database also allows for the graph database to manage itself with respect to previous interactions (e.g. requests for data, changes to data, and algorithm execution), as well as expected future interactions, and to alter this management as time progresses. In certain embodiments, this may involve moving ownership of data between agents (e.g. because data that is used together should be stored together), splitting existing agents into multiple agents (to allow for different representations of parts of the graph structured data within the original router), and/or destroying unnecessary agents (i.e. routers). This continuous management by using the artificially-intelligent agents is completely unlike existing graph databases, where the method of management is typically fixed at creation.

Notably, in one embodiment according to the present disclosure, a system for providing an artificially-intelligent graph database is disclosed. The system may include a memory that stores instructions and a processor that executes the instructions to perform operations conducted by the system. In certain embodiments, the system may perform an operation that includes generating a plurality of artificially-intelligent agents for managing a graph database. Each artificially-intelligent agent of the plurality of artificially intelligent-agents may be associated with a corresponding subgraph of a graph of the graph database. The system may also perform an operation that includes receiving a stream of requests intended for the graph database. Additionally, the system may perform an operation that includes assigning each request of the stream of requests to a corresponding artificially-intelligent agent of the plurality of artificially-intelligent agents. In certain embodiments, the assigning of each request to the artificially-intelligent agent may be based on a relevance of each request to the artificially-intelligent agent, however, in other embodiments, the assigning of each request to the artificially-intelligent agent may be based on any desired criteria. After the requests are assigned to the appropriate artificially-intelligent agent, the system may perform an operation that includes routing each request to the corresponding artificially-intelligent agent to which each request is assigned. The system may proceed to perform an operation that includes processing each request by utilizing the corresponding artificially-intelligent agent. Furthermore, the system may include performing an operation that includes transmitting each output resulting from the processing of each request to a corresponding device, program, or a combination thereof, which made each request.

In another embodiment, a method for providing an artificially-intelligent graph database is disclosed. The method may include utilizing a memory that stores instructions, and a processor that executes the instructions to perform the various functions of the method. In particular, the method may include providing a plurality of artificially-intelligent agents for managing a graph database. In certain embodiments, each artificially-intelligent agent of the plurality of artificially intelligent-agents may be associated with a corresponding subgraph of a graph of the graph database. Additionally, the method may include receiving a stream of requests intended for the graph database, and assigning each request of the stream of requests to a corresponding artificially-intelligent agent of the plurality of artificially-intelligent agents. In certain embodiments, the assigning of each request to the artificially-intelligent agent may be based on a relevance of each request to the artificially-intelligent agent. In certain embodiments, the assigning of each request to a corresponding artificially-intelligent agent may be based on any desired criteria. The method may also include providing each request to the corresponding artificially-intelligent agent to which each request is assigned. Furthermore, the method may include processing each request by utilizing the corresponding artificially-intelligent agent. Moreover, the method may include obtaining each output resulting from the processing of each request.

According to yet another embodiment, a computer-readable device, such as a non-transitory computer-readable device, having and storing instructions for providing an artificially-intelligent graph database is provided. The computer instructions, which when loaded and executed by a processor, may cause the processor to perform operations including: providing a plurality of artificially-intelligent agents for managing a graph database, wherein each artificially-intelligent agent of the plurality of artificially intelligent-agents is associated with a corresponding subgraph of a graph of the graph database; accessing a stream of requests intended for the graph database; assigning each request of the stream of requests to a corresponding artificially-intelligent agent of the plurality of artificially-intelligent agents, wherein the assigning of each request to the artificially-intelligent agent is based on a relevance of each request to the artificially-intelligent agent; sending each request to the corresponding artificially-intelligent agent to which each request is assigned; and processing, by utilizing the corresponding artificially-intelligent agent, each request to produce an output for each request.

These and other features of the systems and methods for providing an artificially-intelligent graph database are described in the following detailed description, drawings, and appended claims.

DETAILED DESCRIPTION OF THE INVENTION

Figure 1:
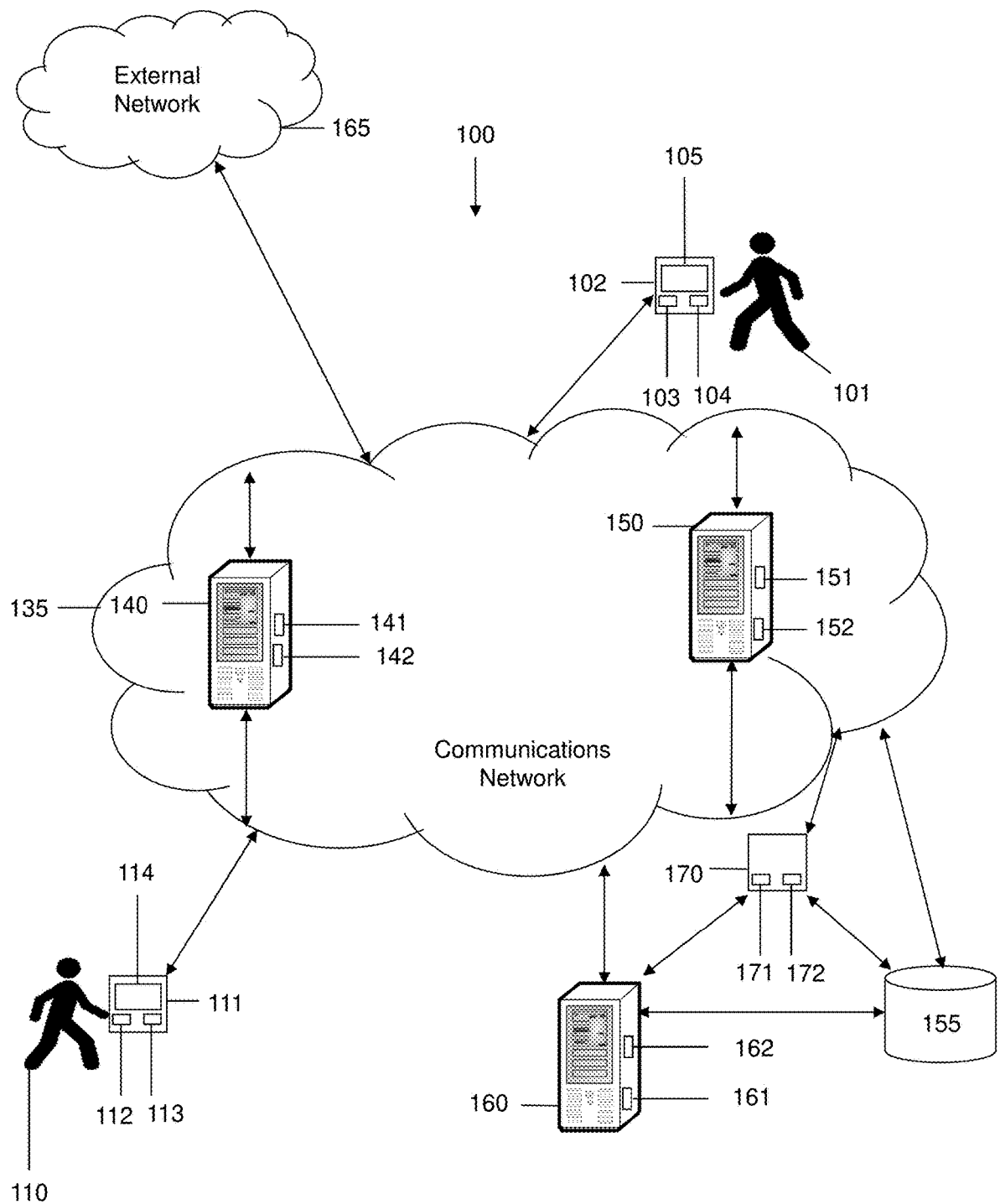
FIG. 1 is a schematic diagram of a system for providing an artificially-intelligent graph database according to an embodiment of the present disclosure.

A system 100 and accompanying methods for providing an artificially-intelligent graph database are disclosed. Graph databases and distributed graph computing systems have traditionally abstracted the design and execution of graph algorithms by encouraging users to take the perspective of static graph objects, such as vertices and edges. Notably, the system 100 and methods facilitate the creation of a SmartGraph, which is a graph database that instead relies upon thinking and behaving much like a smarter device often found in real-life computer networks, such as a router. By utilizing a router-inspired abstraction to encapsulate vertices and edges of a graph, the system 100 and methods disclosed herein facilitate the use of multiple graph representations with local (implementation specific) indexing and highly concurrent execution of analytics. The system 100 and methods demonstrate how this abstraction allows for artificial intelligence capabilities to be integrated as a centerpiece for graph database technologies.

Data is often thought of in the context of input and output, which can be used or analyzed by some external program or process. The structure of graph data, however, can indicate useful information about how to best execute graph based algorithms on that structure. This may be demonstrated by a key refrain for existing graph computing paradigms; to "think like a vertex." In the present disclosure, the system 100 and methods provide the benefits of further integrating graph data with the analytics run on that data by creating an artificially-intelligent graph database. When (sub)graphs have knowledge of their own properties, the ability to send messages to other (sub)graphs, run calculations concurrently, and perform self-modification, a graph is no longer a static source of data. Instead, the graph begins to resemble a network of routers. In the present disclosure and in certain embodiments, the "think like a vertex" mantra is replaced with "think like a router," using a router-inspired abstraction to create a SmartGraph database.

Notably, asynchronous concurrent execution is difficult in traditional distributed graph computing systems because the "think like a vertex" mantra (that was chosen to make reasoning about programs easier) is typically implemented using Bulk Synchronous Parallel methodologies. This typically involves top-level maintenance of lists of active vertices (and/or edges) during each superstep that all perform the same vertex calculation. Such top-level maintenance of lists can waste computing cycles, since many graph algorithms do not converge at the same rate across different nodes. Existing solutions to this issue often focus on maintaining sets of which nodes (or edges) need to be updated during each iteration, and therefore despite acknowledgment of asymmetric convergence rates, ultimately still use a synchronous iterative system.

The functionality provided by the system 100 and methods differs from existing methods for graph computing in that the system 100 and methods have complex, but manageable asynchronous concurrency of execution that eliminates the need for iterative supersteps, and, more generally, the need for external macro-level management of the graph database and execution process. The functionality provided by the system 100 and methods is also distinguished from existing graph databases through the artificially-intelligent router abstraction, where the routers that are defined by the subgraphs they encapsulate manage graph representation, concurrency, and execution of operations themselves, as opposed to being simple static data managed by an external process. As a result, the system 100 and methods allow for a wide range of graph algorithms to be written more naturally than with existing approaches (e.g. vertex centric approaches requiring logic to be compressed into vertex update functions). In certain embodiments, the system 100 and methods provide artificially-intelligent routers that facilitate the micro-management of every aspect of a graph database through their ability to reason and interact. By having artificial intelligence inside the graph database itself, it facilitates a plethora of features not possible with traditional graph databases. Such features include, but are not limited to, significantly increased ability to run graph algorithms asynchronously and concurrently without blocking regular graph database functionality, and the capability to execute algorithms and changes to the graph database dynamically in response to learned and user-specified triggers.

In a modern graph database, it is often a functional requirement that not only should the system be able to deal with large amounts of data, but that the system should also be able to deal with a large amount of different requests with limited computational resources. The SmartGraph functionality provided by the system 100 and methods facilitates massive concurrency involving graph operations on graph-based data by explicitly tying this graph structure into a concurrency management mechanism (through the router abstraction described below in the present disclosure). Concurrency may be a property of a system that allows multiple processes (that may be related or entirely distinct) to have overlapping lifetimes. In certain embodiments, this does not necessarily mean that the multiple concurrent processes execute simultaneously at the hardware level (indeed, unlike parallelism, concurrency can be achieved on a single thread), it may simply refer to processes being able to be paused momentarily on a single thread, while other processes are given priority. Unlike parallelism which is typically thought of as simultaneous execution of very similar tasks, concurrent aware design can be a way of abstracting highly-complex multi-part systems so that different processes can interweave with one another, resulting in the appearance of simultaneous execution. This appearance may be an illusion, such as a single-threaded central processing unit (CPU) allowing a browser and word processor to run "at the same time" by quickly alternating cycles between each concurrent process. It may also be a reality, in the case that process tasks are allocated to separate threads of the CPU.

Figure 2:
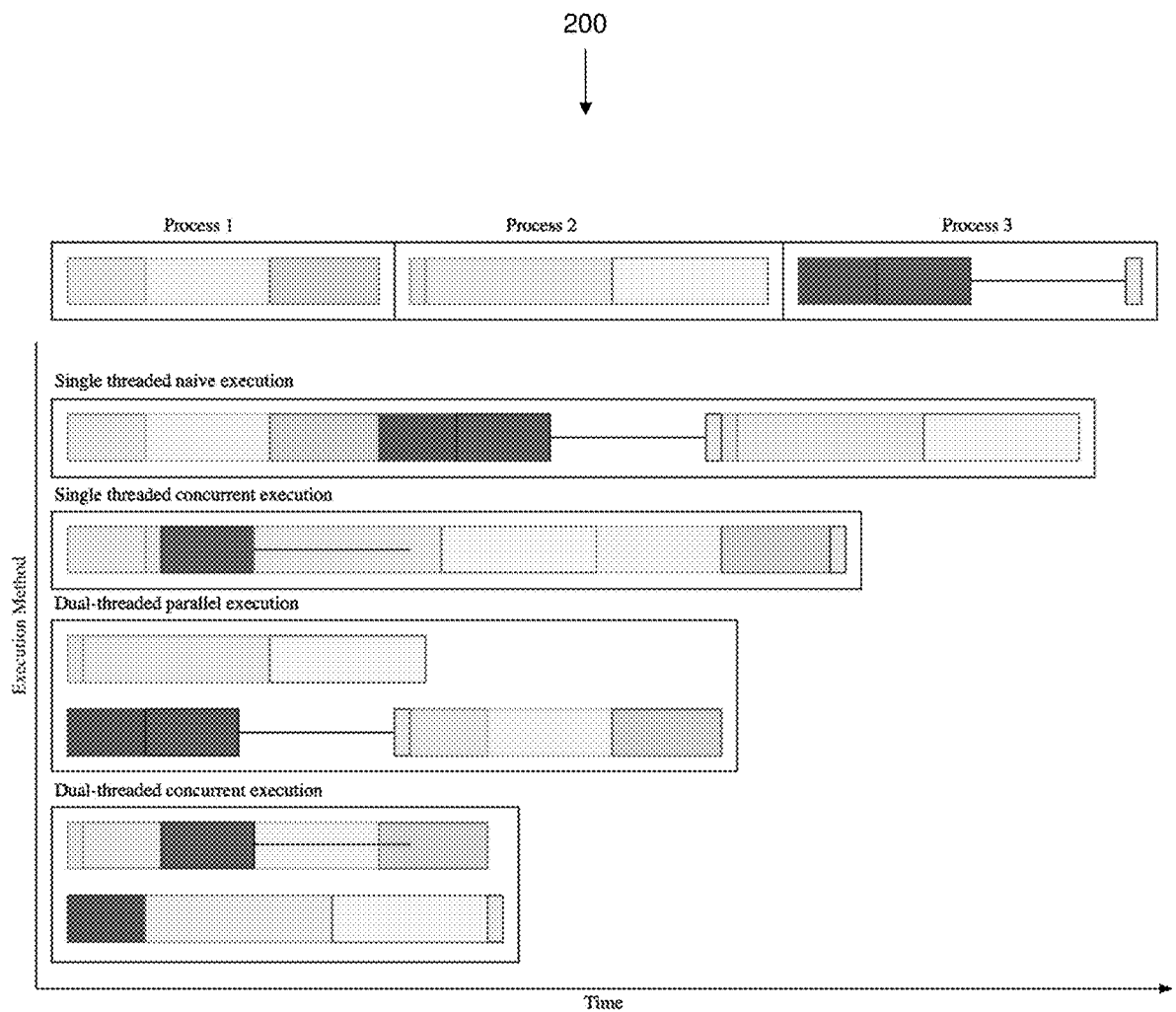
FIG. 2 is a schematic diagram illustrating a comparison of concurrent and parallel execution in single and multi-threaded environments.

Referring now to FIG. 2, a diagram 200 outlines the differences (and similarities) between naive parallel execution and concurrent execution using three fictitious processes. Note that one can take advantage of the delay in Process 3 (e.g. representing some external servers computation that needs to be complete before the process can be finished) using concurrency in both the single-threaded and dual-threaded scenarios. The dual-threaded and concurrent execution model takes advantage of parallelism more effectively than naive parallel execution of the processes; the ability to move process tasks between threads facilitates a consistent high load and shorter overall execution time. Communicating Sequential Processes (CSP) are a method of implementing concurrency in programs based on message passing. In certain embodiments, the functionality provided by the system 100 and methods provided in the present disclosure may take some liberty with the theory of CSP as a whole, and instead focuses on CSP as it is implemented in the programming language Go (i.e. Golang). In Golang, CSP may be implemented through two main concurrency primitives: goroutines and channels. A goroutine may be a very lightweight function that can be multiplexed onto different threads to be run concurrently with one another (and the Main, which may itself be a goroutine). In certain embodiments, goroutines may communicate not by sharing memory, but may "share memory by communicating" through the use of the channels. The simplest Golang channels may "block" until there is a goroutine that wants to read from the channel at the same time as a goroutine that wants to write to the channel (at which point the channel permits the sending routine to push the message into the channel, and the reading routine to pull that message out).

As shown in FIGS. 1-13, a system 100 and methods 700, 800, 900, 1200 for providing an artificially-intelligent graph database are disclosed. Notably, the system 100 may also be utilized to provide a graph database that uses artificial intelligence to interlay, (micro-) manage, and arrange graph data and algorithm execution based upon prior and forecasted usage patterns. The system 100 may be configured to support, but is not limited to supporting, graph database services, other database services, natural language processing services, machine learning services, data and content services, artificial intelligence services, computing applications and services, cloud computing services, internet services, satellite services, telephone services, software as a service (SaaS) applications and services, mobile applications and services, platform as a service (PaaS) applications and services, web services, client servers, and any other computing applications and services. The system 100 may include a first user 101, who may utilize a first user device 102 to access data, content, and applications, or to perform a variety of other tasks and functions. As an example, the first user 101 may utilize first user device 102 to access an application (e.g. a browser, a database 155, or a mobile application) executing on the first user device 102 that may be utilized to access web pages, data, and content associated with the system 100. In certain embodiments, the first user 101 may be any type of user that may desire to add data to a database 155, manipulate the database 155, access the database 155, access graphs of the database 155, access subgraphs of the database 155, remove data from the database 155, perform any action with respect to the database 155, perform any action with respect to the system 100, or any combination thereof.

The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with the database 155, to interact with various applications executing within the system 100, and to interact with the system 100 itself. In certain embodiments, the first user device 102 may include components that provide non-visual outputs. For example, the first user device 102 may include speakers, haptic components, tactile components, or other components, which may be utilized to generate non-visual outputs that may be perceived and/or experienced by the first user 101. In certain embodiments, the first user device 102 may be configured to not include interface 105. In certain embodiments, the first user device 102 may be a computer, a laptop, a tablet device, a phablet, a server, a mobile device, a smartphone, a smart watch, and/or any other type of computing device. Illustratively, the first user device 102 is shown as a mobile device in FIG. 1. In certain embodiments, the first user device 102 may also include a global positioning system (GPS), which may include a GPS receiver and any other necessary components for enabling GPS functionality, accelerometers, gyroscopes, sensors, and any other componentry suitable for a mobile device.

In addition to the first user 101, the system 100 may include a second user 110, who may utilize a second user device 111 to access data, content, and applications, or to perform a variety of other tasks and functions. As with the first user 101, in certain embodiments, the second user 110 may be any type of user that may desire to add data to a database 155, manipulate the database 155, access the database 155, access graphs of the database 155, access subgraphs of the database 155, remove data from the database 155, perform any action with respect to the database 155, perform any action with respect to the system 100, or any combination thereof. Much like the first user 101, the second user 110 may utilize second user device 111 to access an application (e.g. a browser or a mobile application) executing on the second user device 111 that may be utilized to access web pages, data, and content associated with the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. a screen, a monitor, a graphical user interface, etc.) that may enable the second user 110 to interact with various applications executing on the second user device 111, to interact with various applications executing in the system 100, to interact with the database 155, and to interact with the system 100. In certain embodiments, the second user device 111 may be a computer, a laptop, a tablet device, a phablet, a server, a mobile device, a smartphone, a smart watch, and/or any other type of computing device. Illustratively, the second user device 111 may be a computing device in FIG. 1. The second user device 111 may also include any of the componentry described for first user device 102.

In certain embodiments, the first user device 102 and the second user device 111 may have any number of software applications and/or application services stored and/or accessible thereon. For example, the first and second user devices 102, 111 may include database applications, graph database applications, artificial intelligence-based applications, machine learning-based applications, applications for facilitating the completion of tasks, cloud-based applications, search engine applications, natural language processing applications, database applications, algorithmic applications, phone-based applications, product-ordering applications, business applications, e-commerce applications, media streaming applications, content-based applications, gaming applications, internet-based applications, browser applications, mobile applications, service-based applications, productivity applications, video applications, music applications, social media applications, presentation applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications executing on the first and second user devices 102, 111 may be applications for receiving data, applications for storing data, applications for transforming data, applications for executing mathematical algorithms, applications for generating and transmitting electronic messages, applications for generating and transmitting various types of content, any other type of applications, or a combination thereof. In certain embodiments, the first and second user devices 102, 111 may include associated telephone numbers, internet protocol addresses, device identities, or any other identifiers to uniquely identify the first and second user devices 102, 111 and/or the first and second users 101, 110. In certain embodiments, location information corresponding to the first and second user devices 102, 111 may be obtained based on the internet protocol addresses, by receiving a signal from the first and second user devices 102, 111, or based on profile information corresponding to the first and second user devices 102, 111. In certain embodiments, the location information may be obtained by utilizing global positioning systems of the first and/or second user devices 102, 111.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof. Illustratively, server 140 and server 150 are shown as being included within communications network 135.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140 and 150 may be utilized to perform the various operations and functions provided by the system 100, such as those requested by applications executing on the first and second user devices 102, 111. Additionally, the servers 140, 150 may be configured to perform any of the various operations described in the present disclosure, which may be utilized to facilitate the operation of the artificially-intelligent graph database. In certain embodiments, the server 140 may include a memory 141 that includes instructions, and a processor 142 that executes the instructions from the memory 141 to perform various operations that are performed by the server 140. The processor 142 may be hardware, software, or a combination thereof. In certain embodiments, in addition to the storage capabilities of the database 155 discussed in further detail in this disclosure, the servers 140, 150 may include storage components that may be configured to store and maintain any information generated by the system 100 and/or methods described herein, or a combination thereof. Much like server 140, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may store the output from any operation performed by the system 100, operations performed and output generated by the first and second user devices 102, 111, the servers 140, 150, 160, or any combination thereof. In certain embodiments, the database 155 may be a graph database, any type of database, or any combination thereof. The database 155 may also incorporate any functionality of any existing graph database. In certain embodiments, the database 155 may store a record of any and all information generated by the system 100, store any information associated with the artificially-intelligent agents (e.g. routers), store any information associated with graph representations utilized in the system 100, store graph-structured data, store graphs, store subgraphs of the graphs, store information associated with assignments of artificially-intelligent agents with subgraphs (or other portions of graphs), store request streams, store algorithm requirements utilized by the system 100, store usage histories associated with the artificially-intelligent agents, store information learned by the artificially-intelligent agents, store correlations between trigger events and requests, cost vs. benefit analyses generated by the system 100, store indices generated by the system 100, store information associated with the ownership of graph components, store media content, store any information generated and/or received by the system 100, any other data traversing the system 100, or any combination thereof. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, the second user device 111, any devices in the system 100, any other device, any network, or any combination thereof.

The database 155 may also store information obtained from the system 100, store information associated with the first and second users 101, 110, store location information for the first and second user devices 102, 111 and/or first and second users 101, 110, store user profiles associated with the first and second users 101, 110, store device profiles associated with any device in the system 100, store communications traversing the system 100, store user preferences, store demographic information for the first and second users 101, 110, store information associated with any device or signal in the system 100, store information relating to usage of applications accessed by the first and second user devices 102, 111, store any information obtained from any of the networks in the system 100, store historical data associated with the first and second users 101, 110, store device characteristics, store information relating to any devices associated with the first and second users 101, 110, or any combination thereof. The user profiles may include any type of information associated with an individual (e.g. first user 101 and/or second user 110), such as, but not limited to, a username, a password, contact information, demographic information, psychographic information, an identification of applications used or associated with the individual, any attributes of the individual, any other information, or a combination thereof. Device profiles may include any type of information associated with a device, such as, but not limited to, operating system information, hardware specifications, information about each component of the device (e.g. sensors, processors, memories, batteries, versions, etc.), attributes of the device, any other information, or a combination thereof. In certain embodiments, the database 155 may store algorithms facilitating the operation of the system 100. In certain embodiments, the database 155 may be configured to store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

In certain embodiments, the system 100 may communicate and/or interact with an external network 165. In certain embodiments, the external network 165 may include any number of servers, databases, or other componentry, and, in certain embodiments, may be controlled by a service provider. The external network 165 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof. In certain embodiments, the external network 165 may be accessed by the components of the system 100, such as the database 155, the server 140, 150, and the server 150. For example, the database 155 may access resources of the external network 165 to supplement the data stored in the database 155, to confirm data in the database 155, and/or to perform any other operations. In certain embodiments, the external network 165 may be accessed by the components of the system 100 to obtain data and information that may potentially be utilized to obtain graph-structured data for use with the graphs and/or subgraphs of the database 155, obtain data to be utilized by the artificially-intelligent agents, obtain data that may be utilized for any artificial-intelligence-related operation conducted by the system 100, or any combination thereof.

The system 100 may also include a software application or program, which may be configured to perform and support the operative functions of the system 100. In certain embodiments, the application may be a software program, a website, a mobile application, a software application, a software process, or a combination thereof, which may be made accessible to users utilizing one or more computing devices, such as first user device 102 and second user device 111. In certain embodiments, the software application or program may include one or more applications that may be configured to interact with the database 155 and/or a virtual database, and may include any functionality that may be utilized to support the functionality of the system 100 and/or the methods disclosed herein. The application of the system 100 may be accessible via an internet connection established with a browser program executing on the first or second user devices 102, 111, a mobile application executing on the first or second user devices 102, 111, or through other suitable means. Additionally, the application may allow users and computing devices to create accounts with the application and sign-in to the created accounts with authenticating username and password log-in combinations. The application may include a custom user interface that the first user 101 or second user 110 may interact with, such as by utilizing a web browser or other program executing on the first user device 102 or second user device 111. In certain embodiments, the software application may execute directly as an installed program on the first and/or second user devices 102, 111, such as a mobile application or a desktop application. In certain embodiments, the software application may execute directly on any combination of the servers 140, 150, 160.

The software application may include multiple programs and/or functions that execute within the software application and/or are accessible by the software application. For example, the software application may include an application that generates web content and pages that may be accessible to the first and/or second user devices 102, 111, any type of program, or any combination thereof. The application that generates web content and pages may be configured to generate a user interface 228 for the software application that is accessible and viewable by the first and second users 101, 110 when the software application is loaded and executed on the first and/or second computing devices 102, 111. The user interface for the software application may display content for viewing by the first and/or second users 101, 110 via the first and/or second user devices 102, 111. Additionally, the user interface may display functionality provided by the software application that enables the first and second users 101,110 and/or the first and second computing devices 102, 111 to interact with the software application and any modules supporting the software application's functionality. In certain embodiments, the software application may be configured to facilitate any operation conducted by the system 100, any program or process in the system 100, or any combination thereof.

The system 100 may also include any number of artificially-intelligent agents, which may be configured to facilitate the operative functionality of the system 100 and methods described herein. For the purposes of the present disclosure, the term "artificially-intelligent agents" may be used interchangeably with the term "routers" when the term "routers" is referring to and/or related to the router abstraction concepts provided in the present disclosure. In certain embodiments, the artificially-intelligent agents may comprise software, hardware, or a combination thereof, and may be configured to execute within any device of the system 100 (e.g. database 155, first and/or second user devices 102, 111, servers 140, 150, 160, etc.). In certain embodiments, the artificially-intelligent agents may be implemented using goroutines (or by using any other suitable methodology and/or technology), and the highly concurrent functionality of the goroutines may be a mechanism through which the artificial intelligence of each artificially-intelligent agent is implemented. The functionality provided by the system 100 and methods may be implemented using Golang (and/or by using any other suitable language) by tying goroutines to graph-structured data of a graph of a graph database that is to be explored or used in algorithms to be executed by the system 100. In certain embodiments, the individual goroutines that are used to implement the artificially-intelligent agents may define (not merely control) and/or encapsulate the subgraphs (of a graph of a graph database) of interest, with the relevant graph structure, vertex and edge properties defined in the variable size stack corresponding to the particular goroutine.

Figure 3:
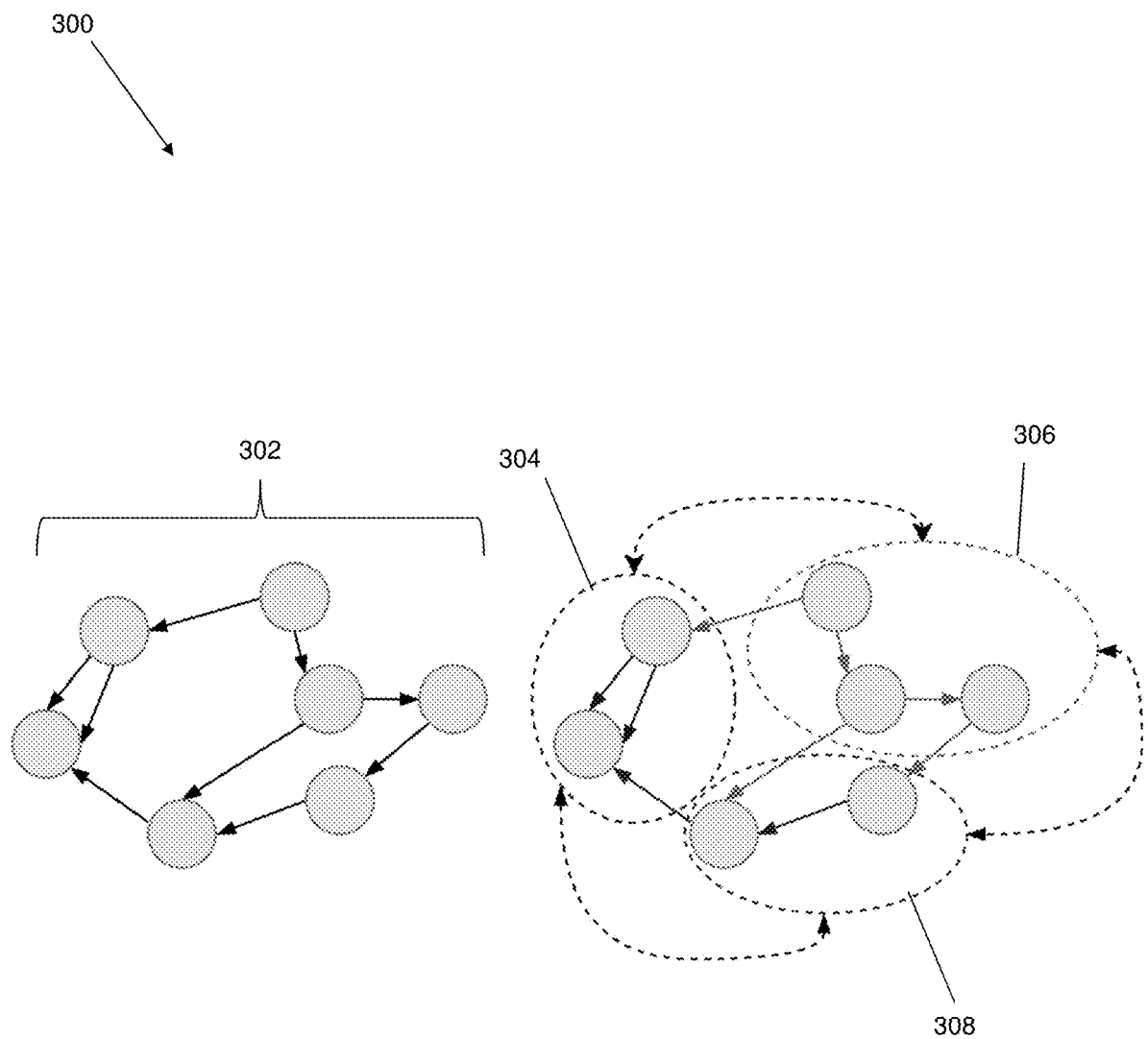
FIG. 3 illustrates a toy graph and a goroutine router/artificially-intelligent agent assignment.

Notably, the close association of concurrent processes and the graph structure has additional savings beyond memory usage. By viewing this as the graph managing its own concurrent execution, the system 100 and methods can do away with the top-level maintenance of sets of vertices, or algorithm iteration supersteps. Concurrent execution is instead automatically handled by the artificial intelligence of each artificially-intelligent agent (i.e. router), as they will (through their status as a goroutine) immediately signal to a scheduler when they are ready (having received required data or messages from parent goroutines) to execute desired operations. This enables the system 100 to be highly asynchronous, yet manageable, based on the router abstraction provided in the present disclosure. A basic example encapsulating a SmartGraph in goroutine agents (i.e. routers) is illustratively shown in the schematic 300 of FIG. 3. On the left hand side of FIG. 3, a toy-directed graph 302 with no particularly noteworthy node or edge features is schematically illustrated. The right hand side of FIG. 3 shows an example set of three goroutine artificially-intelligent agents 304, 306, 308 that encapsulate the SmartGraph. Each artificially-intelligent agent 304, 306, 308, defined by a dotted ellipse of a primary color, may contain a subset of nodes and edges from the overall graph, where each subset of nodes and edges may comprise a subgraph of the overall graph. The dotted black connections on the right hand side of FIG. 3 may represent channels between the source and destination agents 304, 306, 308.

Figure 4:
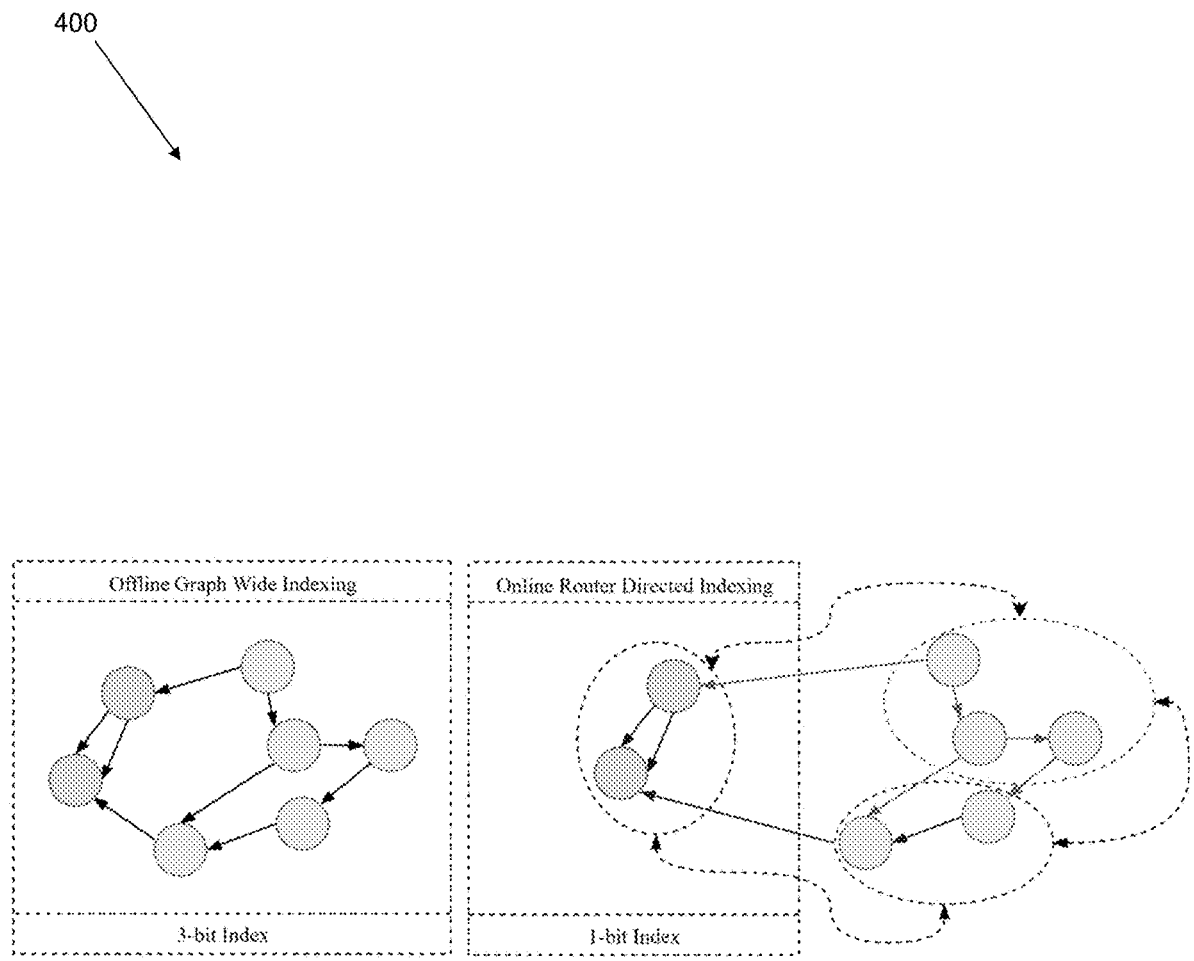
FIG. 4 illustrates a schematic diagram illustrating a comparison of graph-level and router-level vertex indexing.

Referring now also to FIG. 4, a schematic diagram 400 is shown which features a toy comparison of graph-level and router-level (i.e. agent-level) vertex indexing is provided. Notably, a network router is useful not only as an abstraction model for efficiently implementing and executing graph algorithms, but the network router also inspires useful functionality provided by the system 100 and methods (i.e. SmartGraph functionality). Network routers have the ability to maintain useful information in memory, such as routing tables, and also possess the ability to perform custom routing logic independently of other routers. The system 100 and methods incorporate aspects of such functionality into a graph database and analytics platform to provide benefits. In a traditional graph database, indexing (e.g. maintaining an index of certain node labels for quick access without the need for traversing the graph) may be performed at a global level. Through the use of the router abstraction, indexing can be localized to subgraphs of arbitrary size, and can be meta-programmed on the fly by the system 100 and methods based upon changing usage patterns recorded at the artificially-intelligent agent (i.e. router). This can lead to similar storage and computation benefits that conditional probability tables enjoy in Bayesian networks (in comparison to naive storage of the joint distribution). Rather than an index that can address every element of the graph, smaller local address spaces and simpler hashes can be used for faster lookup. The indexing is also more manageable and interpretable, since the indexing is "closer" to the data it is indexing. This means that not only are the indices themselves more succinct, the indices can be created much more efficiently by using the functionality of the system 100 and accompanying methods.

Consider, for example, a request (e.g. a request from first user 101 received from first user device 102) to index a property of a particular vertex type that is used in many graph queries (such a request may be generated by the artificial intelligence of the agent itself upon recognition of the benefit of having such an index). By default, a typical graph database will move to index all vertices with this property, even if only (for example) a localized subgraph of that vertex type is commonly used in the queries the index is attempting to accelerate. This can have enormous performance consequences that mean that indexing is impractical as an online operation, something that is particularly problematic for dynamically changing graph data (including the execution of graph algorithms that creates new graph structures). The "local" aspect of the artificial intelligence of the agent (i.e. router AI) can also be taken further than simple indices. With agents able to act independently, the system 100 and methods facilitate the creation of "local subgraph representation," where the agents (i.e. routers) encapsulating a subgraph do so via different storage mechanisms and graph formats.

Figure 5:
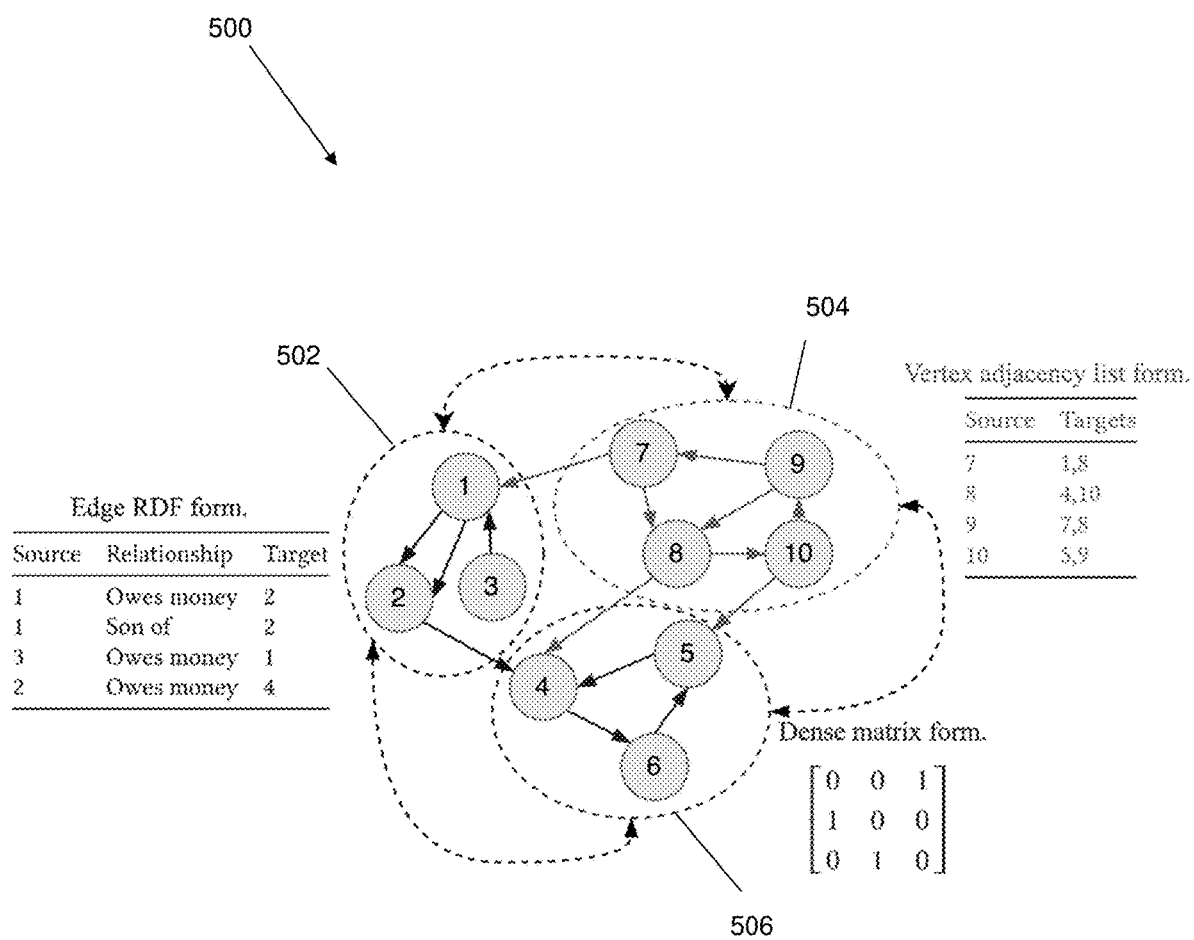
FIG. 5 is a schematic diagram illustrating possible graph representations within routers, which are matched based on color.

For instance, as shown in FIG. 5, the artificial intelligence of one agent 504 (controlling nodes 7-10 and interconnected edges) may organize the subgraph it encapsulates using vertex adjacency lists, with another agent's 502 (controlling nodes 1-3 and interconnected edges) artificial intelligence learning to use an RDF framework, and yet another agent 506 (controlling nodes 4-6 and interconnected edges) using dense matrix form. An example of this sort of agent-dependent representation 500 is provide in FIG. 5. This approach has both computational benefits (since some operations have faster implementations in certain graph representations) and storage benefits (e.g. when using a sparse representation like CSR, or when compressing a subgraph consisting of nodes with high similarity). In the toy example of FIG. 5, it might be useful to be able to run SQL like queries on the blue agent 502 (where joins on the edge-like RDF format are efficient), and matrix multiplications on the red agent 506. Based on the functionality provided by the system 100 and methods, the system 100 and methods provide the first graph database to natively store the graph structured data in a variety of forms with automatic mechanisms to allow these different representations to interact (without the need for manual conversions or boilerplate code), and the first to do so through artificial-intelligence mechanisms considering past database requests, and its expectation of future database requests that are yet to come.

Figure 6:
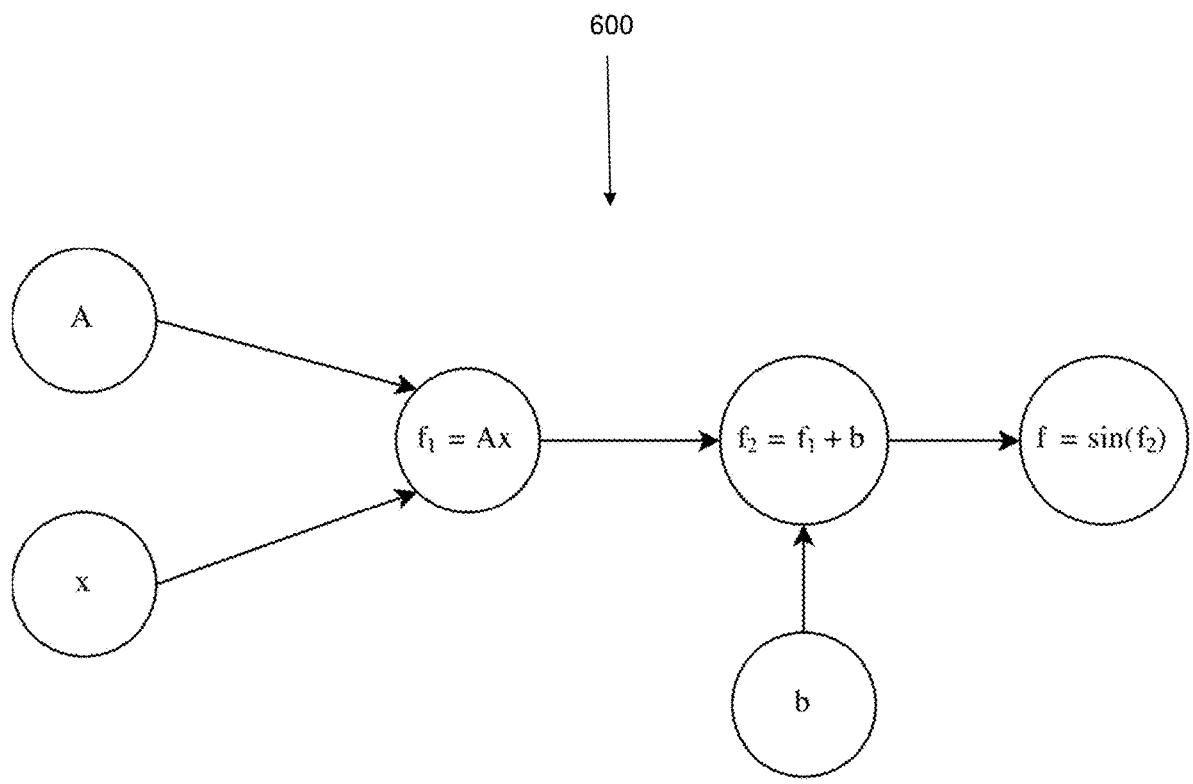
FIG. 6 illustrates a schematic diagram illustrating a computational graph, which may be utilized by the system of FIG. 1.

In certain embodiments, the mechanism through which artificial intelligence of an agent implements graph algorithms in the system 100 and methods, and do so by means of comparison to a popular alternative for describing algorithms in distributing computing systems may be a computational graph. An operation (or op) of a computational graph may be a node that represents a procedure to be applied to some data (the result of which may be output). By chaining ops together with directed edges from one op to another (representing that the output of the first op is an input of the second), it is possible to describe complex algorithms as so-called computational graphs. Though there is no clear limit on the complexity of an op (e.g. "add two inputs together" and "perform a Fast Fourier-Transform of the input" could both be considered ops), there is a tendency to make ops more fundamental to facilitate simple transcription of complex algorithms into computational graph form. FIG. 6 demonstrates a very simple computational graph 600 representing the computation $f(A; x; b)=\sin(Ax+b)$, where f1 is a multiplication op, f2 is an addition op, and the final f op applies a sinusoidal operator. Note that the structure of the inputs (and therefore the definition of "multiplication", "addition", etc. has purposefully not been defined). In traditional deep learning systems, the inputs may be tensors. In the present disclosure, a computational graph system is proposed with at least two key differences to standard computational graph systems. The first is that the "inputs" and "outputs" of ops are not restricted to tensors, but are instead allowed to be general graph-structured data. Therefore, there are operations such as "find neighbors" in addition to ops corresponding to the likes of addition and multiplication.

A second substantial difference, one which facilitates the first, is that ops do not process data, data instead processes ops. This may be achieved by the ability of the artificial intelligence of an agent to choose to execute ops (e.g. artificial intelligence of an agent may determine that it would be useful to execute the ops required to create an index that it predicts will be beneficial in the future), as well as communicate with and pass (receive) ops to (from) other routers for implementation. A rationale for this choice is that this approach may be more natural for graph-structured data; typically graph analysis and mining involves large singular instances of a graph database to which a variety of different algorithms or jobs are applied (for example, hundreds of customers wishing to perform graph queries of an enormous financial transaction system), with ops requiring modification of the graph being comparatively rare. Instead of repeatedly passing this large identical graph structured data through different computational graphs as "messages", the messages may instead be instructions to the artificial intelligence of the agents regarding what ops to implement on the subgraph encapsulated by each agent. This approach is a more natural fit for graph-structured data when considering the most common type of graph algorithm executed on graph databases; queries that explore the data. In the system 100 and methods disclosed herein, this corresponds to the agents sending messages to other agents describing the properties of the desired traversal. When viewed through this lens, one may interpret the approach provided by the system 100 and methods as being functionally similar to how the Gremlin graph query language executes queries by passing traverser objects throughout the graph. However, unlike the BSP approach of Gremlin, the system 100 and methods focus on asynchronous concurrency, and can implement a far wider range of operations than those corresponding to simple traversals.

Artificially-intelligent management of a graph database provided by the system 100 and methods also allows for the graph database to manage itself with respect to previous interactions (e.g. requests for data, changes to data, and algorithm execution), as well as expected future interactions, and to alter this management as time progresses. This may involve moving ownership of data between agents (e.g. because data that is used together should be stored together), splitting existing agents into multiple agents (to allow for different representations of parts of the graph structured data within the original agent), or destroying unnecessary agents. This continuous management by the artificial intelligence of the agents is completely unlike existing graph databases, where the method of management is typically fixed at creation. As discussed above, an artificially-intelligent agent can be used for the purposes of local structural representation (e.g. the artificial intelligence of the agent learns that it is being used for certain operations that are faster with particular representation formats) and index generation (e.g. the artificial intelligence of the agent decides that algorithm execution would benefit from creating indices associated with common queries). Integrated artificial intelligence is useful in a graph database in other ways, with a particular focus on dynamic responses to event triggers. Event triggers may involve a variety of different scenarios, such as time elapsing, additions to graph structure, certain results of algorithms, and changes in access pattern characteristics, among others.

Consider, for instance, a graph database of financial transactions recorded by a large commercial bank. Such a graph will have (at the minimum) vertices representing customers (including individuals, joint accounts, companies etc.) and edges representing financial transactions between these customers (for the purposes of describing the artificial-intelligence functionality, assume that all transactions are between the bank's customers). For fiduciary, legal, and regulatory (in addition to a general desire for profitability), banks are interested in the information conveyed by transactions between customers. For instance, banks are interested in detecting fraudulent transactions. The functionality provided by the system 100 and methods may teach the artificial intelligence of an agent to dynamically investigate new transactions as they are added to the graph database (which the analysis of such transactions requiring access to the corresponding nodes and potentially the immediate neighborhood of the edge) for evidence of fraud. This means that each time an edge is added, the agent's artificial intelligence can schedule and manage the execution of a fraud detection algorithm to be run as soon as the system 100 allows. Note that this may be only feasible to the highly concurrent asynchronous nature of the agent's artificial intelligence. Top-level synchronous management of a graph database (without the concurrency support facilitated by the agents in the system 100 and methods) means that it may be very difficult to do multiple things at once, such as running fraud detection algorithms on-the-fly, while maintaining regular graph database functionality (such as the ability for users to query the graph database, or to add additional graph structure to the database). This means that graph database analytics in traditional graph databases may, by necessity, be manually scheduled to be run every once a day or week (during which the database is taken offline). Through the agent's artificial intelligence having the ability to reactively run fraud detection algorithms on the fly without interrupting regular use of the graph database, the system 100 and methods ultimately return results much sooner. The agent's artificial intelligence can also learn to perform certain actions upon detection of anomalies within a graph. For example, an agent's artificial intelligence for an insurance graph database (where the database contains records of users, claims, and the associated information) could flag a suspicious claim for further investigation, or, if the agent is very confident in its determination of a transaction being fraudulent, may run the necessary routines to deny the claim, and do so concurrently with other agents' artificial intelligence processing new claims.

In certain embodiments, the system 100 and methods provide the first graph database that may optimize itself through intelligent local management facilitated by the artificial intelligence of the agents. Additionally, the system 100 and methods may enable automatic locally-managed indexing. In order to do so, the artificial intelligence of the agents may recognize the benefits of indexing based on past performance or waiting requests (e.g. requests to the database 155), and then generate local indices. Locality may make the indices smaller (in terms of number of bits required to store the address or id of the indexed graph component) and the agent "view" means the format of the index is also efficient. Furthermore, the system 100 and methods provide for efficient storage based on prior usage patterns and expected future usage. For example, the artificial intelligence of an agent can determine that it is requesting graph data from another agent frequently, and, as a result, may request ownership of that graph data. The agent is also intelligent in understanding how the graph structure is being used (e.g. lots of matrix multiplications results in CSR storage format). The end result is that the artificial intelligence of the agent ensures that the graph-structured data is stored where it will be must useful (stored with other relevant graph structure used in the same or related operations) in the form that will be most useful.

The system 100 and methods also provide the first graph database with multiple permanent graph representations. While it is common in graph computing to have multiple representations, the additional graph representations (e.g. adjacency matrix) are temporary constructions made during algorithm execution. On the other hand, the system 100 and methods provide the first graph database that proposes that these multiple representations be permanent fixtures of the graph database, and be fully compatible when interacting with one another. Additionally, the system 100 and methods provide the first graph database that manages itself through intelligent local concurrent execution of appropriate routines by using the artificial intelligence of agents. To that end, the artificial intelligence of each agent may execute operations on itself under preset conditions. For example, a financial transaction graph database may be set to automatically run an iteration of a dynamic fraud detection algorithm on a new financial transaction edge, and relevant graph components (e.g. the transaction may update the "trust-worthiness" of the customer nodes between whom the transaction was executed). This means that the system 100 and methods do not have to setup "manually run our fraud detection algorithm" as a must-do item each night, and also allows concurrent execution of other algorithms (a graph-wide dynamic update algorithm would otherwise lock down the entire graph for the duration of algorithm execution) by only temporarily blocking individual agents.

The system 100 and methods also enable agents to execute operations on themselves under conditions learned by the artificial intelligence supporting each agent. Individual routers in the graph database may retain local history of access patterns and operation requests. This means that individual agents can learn to anticipate future requests, and can accommodate the requests beforehand if the current load on the system allows. A simple example of this is index generation, but this could be extended to far more complex algorithms. The system 100 and methods also provide a novel agent/router abstraction as an intelligent concurrent processing unit. Furthermore, the system 100 and methods allows for a flexible op-driven paradigm that does not require complex algorithms to be distilled into vertex update functions, etc. In certain embodiments, the system 100 and methods can allow for individual agent/router locking. In other words, the functionality provided by the system 100 avoids the need to lock an entire graph when writing to it. Instead, channels may naturally limit simultaneous write access for individual agents/routers, and the system 100 can write to different agents/routers concurrently.

In certain embodiments, the functionality provided by system 100 and methods provide high throughput, but asynchronous computation, which is a contrast with Bulk Synchronous Parallel approaches that are synchronous rather than asynchronous, and are centrally managed. The system 100 and methods provide a new way of managing complex asynchronous behavior. Notably, asynchronicity usually results in a very complex central server to manage execution. This is not required in the system 100 and methods. The system 100 and methods push intelligence to where the intelligence is needed. To that end, the artificial intelligence of the agents can make decisions locally and independently when it is beneficial to do so. In further embodiments, the system 100 and methods provide new type of dataflow framework. Instead of having data be temporary, and operations permanent, the roles may be reversed: data is permanent, and operations are temporary. This is more efficient for large graph analysis, due to many use cases with a singular instance of large graph versus many batches of training tensors in typical machine learning problems. In certain embodiments, operations may be the primary object passed between agents, rather than intermediate results (though the system 100 and methods allow for the possibility of agents exchanging ownership of graph-structured data). In further embodiments, the agents may perform operations on graph structured data in an interpretable manner. The artificial intelligence of the agents may work together to implement algorithms through agent/router-based operations, instead of using uninterpretable embedding techniques or deep learning to explore the graph.

In addition to the foregoing, the system 100 may also include a learning engine 170. The learning engine 170 may be comprised of software, hardware, or a combination thereof, and may be supported by any suitable machine learning and/or artificial intelligence algorithms. The learning engine 170 may be a system that determines patterns and/or associations with respect to requests received by the system 100, features and functionality of artificially-intelligent agents (e.g. router/agents 810-813). In certain embodiments, a learning engine 170 may be contained within some or all of the artificially-intelligent agents, however, in certain embodiments, the learning engine 170 may reside in any separate area and/or device of the system 100 or even external network 165. The learning engine 170 may allow for improved efficiency and accuracy of the system 100, while enabling the agents to perform self-optimization of their various functional features, create indices, reorganize ownership of graph components, determine optimal new representations for subgraphs associated with agents, identify correlations between trigger events and requests, conduct predicted costs vs. benefit analyses, access prior suspected correlations between trigger events and requests, implement changes to the agents and/or subgraphs, create requests, and/or perform any other operative functionality provided by the system 100 and methods disclosed herein. In certain embodiments, the learning engine 170 may train or improve an agent, modify and/or replace an algorithm utilized by an agent, optimize the assignment of incoming requests to the appropriate corresponding agent, improve the efficiency at which requests are processed by agents, improve any operative functionality provided by the system 100 and/or methods, or a combination thereof.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, selecting artificially-intelligent agents (e.g. routers), generating artificially-intelligent agents; assigning graph data and/or subgraphs to artificially-intelligent agents; connecting agents connected based on graph structures; activating agent artificial intelligence; processing requests received by the system 100 and/or database 155; spawn concurrent routines for handling requests received by the system 100 and/or database 155; conduct learning and/or self-optimization operations for enhancing the agents and/or functional features of the system 100; determining if requests have been processed; adding new dynamic algorithm triggers and responses; determining the predicted cost vs. benefit of adding new dynamic algorithm triggers and responses; creating indices; reorganizing ownership of graph components of the graph database utilized in the system 100; modifying graph representations used by the artificially-intelligent agents and/or the system 100; determining correlations between trigger events and requests received by the system 100; routing requests to the artificially-intelligent agents; assigning requests to the artificially-intelligent agents; generating outputs derived from the processing of database requests; facilitating communication between and among agents; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-13 illustrates specific example configurations of the various components of the system 100, the system 100 may include any configuration of the components, which may include using a greater or lesser number of the components. For example, the system 100 is illustratively shown as including a first user device 102, a second user device 111, a communications network 135, a server 140, a server 150, a server 160, and a database 155. However, the system 100 may include multiple first user devices 102, multiple second user devices 111, multiple communications networks 135, multiple servers 140, multiple servers 150, multiple servers 160, multiple databases 155, or any number of any of the other components inside or outside the system 100. Similarly, the system 100 may include any number of artificially-intelligent agents, any number of graph databases, any number of graphs, any number of subgraphs, any other component, program, or device of the system 100, or a combination thereof. In certain embodiments, substantial portions of the functionality and operations of the system 100 may be performed by other networks and systems that may be connected to system 100. In certain embodiments, the system 100 may operate in a multi-threaded environment with multiple instances of each module, program, and/or component of the system 100 operating in parallel. Such parallel operations may be limited, in certain embodiments, by predetermined limits, performance metrics and statistics, hardware availability, user interfaces, external interfaces, and access limitations associated with the system 100 and/or database 155.

Figure 7:
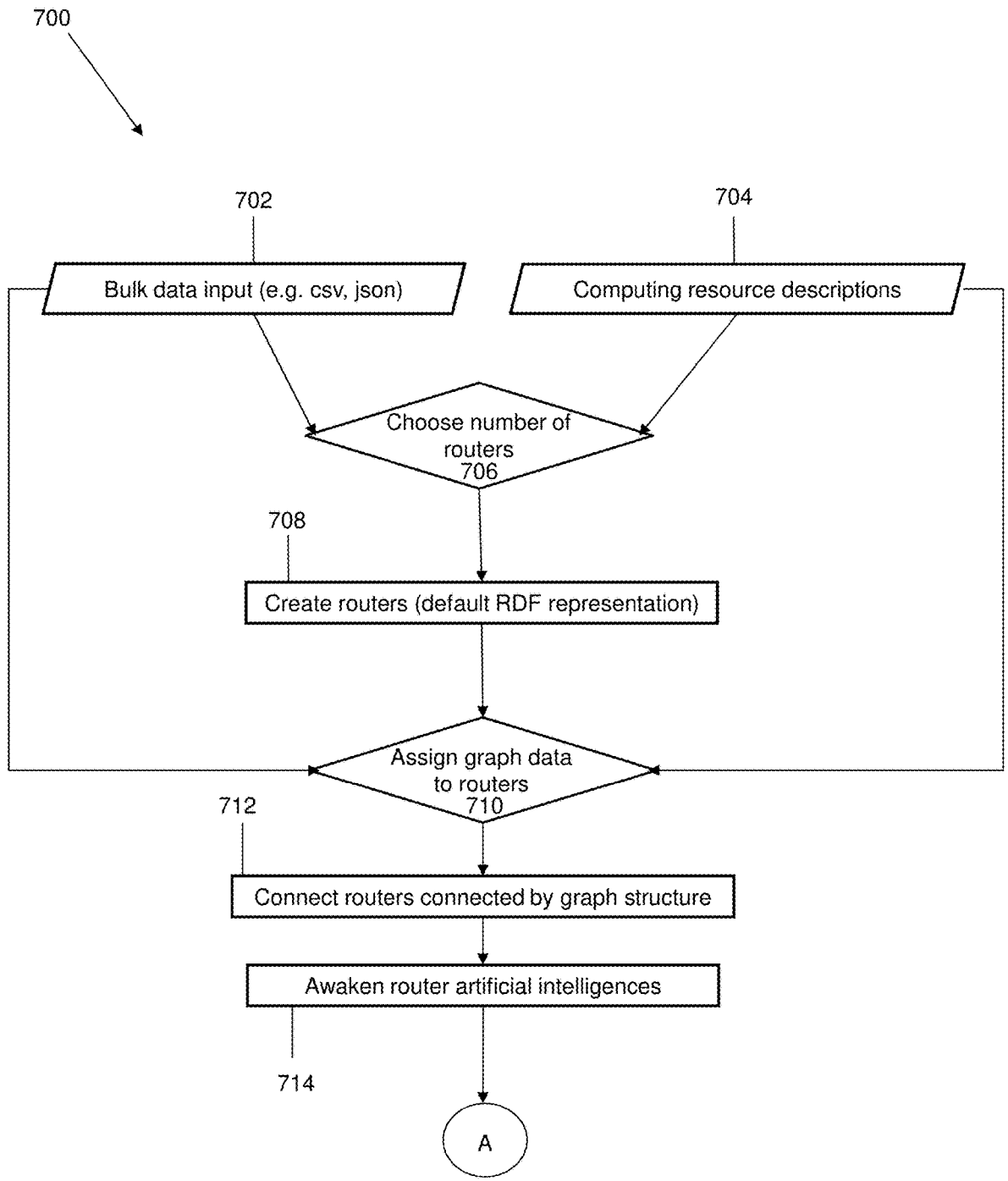
FIG. 7 is a flow diagram illustrating a sample method for providing initial data load and SmartGraph initialization according an embodiment of the present disclosure.

As shown in FIG. 7, an exemplary method 700 for providing initial data load and initialization of the system 100 (i.e. the SmartGraph system) is schematically illustrated. Method 700 may serve as an initial loading process of the system 100. The method 700 results in the artificial intelligence of artificially-intelligent agents (i.e. routers) being activated. As it is the online operation of the artificial intelligence in each agent (and the decisions and inferences that the artificial intelligence makes), the initialization process may have some similarities to a standard graph database, however, the method 700 can allow multiple agents per computational resource (e.g. computer or other resource) and can allow for a standardized representation for all agents before a more appropriate representation can be determined by each agent's artificial intelligence functionality. For the purposes of method 700, a user, such as first user 101, or a device, such as first user device 102, may be interested in requesting information from the database 155, updating information in the database 155, removing and/or deleting information from the database 155, performing any operation with respect to the database 155, performing any other operation, or any combination thereof. At step 702, the method 700 may include providing bulk data input in to the system 100, such as into the database 155. In certain embodiments, the bulk data input may have any desired format, including, but not limited to, comma-separated value (CSV) formatted data, JavaScript Object Notation (JSON) formatted data, any type of formatted data, or any combination thereof. In certain embodiments, the providing may be performed and/or facilitated by utilizing the first user device 102, the second user device 111, the server 140, the server 150, the database 155, the server 160, the communications network 135, any combination thereof, or by utilizing any other appropriate program, network, system, or device. At step 704, the method 700 may include providing descriptions of various computing resources into the system 100, such as into the database 155. In certain embodiments, the computing resource descriptions may include, but are not limited to, information identifying a quantity of computing resources (e.g. processors, memories, databases, computing devices, other computing resources, servers, etc.) for processing and/or handling the bulk data input, any type of data of the database 155, or a combination thereof; information identifying a type of computing resources needed; information identifying formatting requirements for data; information identifying one or more types of algorithms that may be needed to process data; any other type of computing resource description, or a combination thereof. In certain embodiments, providing of the computing resource descriptions may be performed and/or facilitated by utilizing the first user device 102, the second user device 111, the server 140, the server 150, the server 160, the communications network 135, the database 155, any combination thereof, or by utilizing any other appropriate program, network, system, or device.

At step 706, the method 700 may include selecting or choosing the number of artificially-intelligent agents (i.e. routers) for processing and/or handling the bulk data input provided in step 702 and based on the computing resource descriptions provided in step 704. In certain embodiments, the selecting or choosing may be performed and/or facilitated by utilizing the first user device 102, the second user device 111, the server 140, the server 150, the database 155, the server 160, the communications network 135, any combination thereof, or by utilizing any other appropriate program, network, system, or device. At step 708, the method 700 may include creating one or more artificially-intelligent agents (i.e. routers) for processing and/or handling the bulk data input and/or performing operations with respect to the graph data of the database 155. In certain embodiments, creating of the artificially-intelligent agents may include generating graph representations for each artificially-intelligent agent. For example, the graph representations may include, but are not limited to, Resource Description Framework (RDF)-based representations, representations based on vertex adjacency lists, representations based on dense matrices, any other type of representations, or any combination thereof. In certain embodiments, the creating of the artificially-intelligent agents may be performed and/or facilitated by utilizing the first user device 102, the second user device 111, the server 140, the server 150, the database 155, the server 160, the communications network 135, any combination thereof, or by utilizing any other appropriate program, network, system, or device.

At step 710, the method 700 may include assigning one or more portions of graph data (or any other type of data) of the data input provided in step 702 and/or existing in the database 155 to one or more of the artificially-intelligent agents. In certain embodiments, the assigning may be based on a relevance of the graph data to various aspects of a particular agent. For example, a portion of graph data may be assigned based on a type of format of the data corresponding to a particular agent that is configured to specifically process that specific type of format, a portion of graph data may be assigned to an agent based on the content of the data, a portion of the graph data may be assigned to an agent based on a size of the data, a portion of the graph data may be assigned to an agent based on a type of algorithm needed to process the data, a portion of the graph data may be assigned to an agent based on the agent having software functions suited to handle and/or process the data, a portion of the graph data may be assigned based on any type of correlation with a particular agent(s), or any combination thereof. In certain embodiments, the artificially-intelligent agents may be assigned to one or more subgraphs of a graph of the database 155. In certain embodiments, the assigning may be performed and/or facilitated by utilizing the first user device 102, the second user device 111, the server 140, the server 150, the database 155, the server 160, the communications network 135, any combination thereof, or by utilizing any other appropriate program, network, system, or device.

At step 712, the method 700 may include connecting artificially-intelligent agents by graph structure. In certain embodiments, one agent may be connected to one or more other agents based on having one or more features (e.g. functional software features) in common with an agent, based on an agent having functionality that is needed by another agent to process certain graph data, based on an agent having a common algorithm with another agent, based on an agent controlling data correlating to the data controlled by another agent, based on an agent having a similar (e.g. threshold level of similarity) graph structure to the graph structure of another agent, any type of correlation between agents and/or data controlled and/or handled by an agent, or any combination thereof. In certain embodiments, the connecting may be performed and/or facilitated by utilizing the first user device 102, the second user device 111, the server 140, the server 150, the database 155, the server 160, the communications network 135, any combination thereof, or by utilizing any other appropriate program, network, system, or device. At step 714, the method 700 may include awakening the artificial-intelligence capabilities of each artificially-intelligent agent. For example, during the awakening, each artificially-intelligent agent may be activated by the system 100 and any algorithms, functionality, and/or features that an agent may execute may be initiated by the system 100. In certain embodiments, the awakening may be performed and/or facilitated by utilizing the first user device 102, the second user device 111, the server 140, the server 150, the database 155, the server 160, the learning engine 170, the communications network 135, any combination thereof, or by utilizing any other appropriate program, network, system, or device. Once the artificial-intelligence capabilities of the artificially-intelligent agents are awoken, the method 700 may include proceeding to Node A illustrated in FIG. 7, which continues to and links with method 800 that illustrates the connection step 714 to the agents 810-813 (i.e. routers) that are awoken via step 714. Notably, the method 700 may incorporate any of the functionality of the system 100 and/or any of the functionality of any of the other methods described in the present disclosure.

Figure 8:
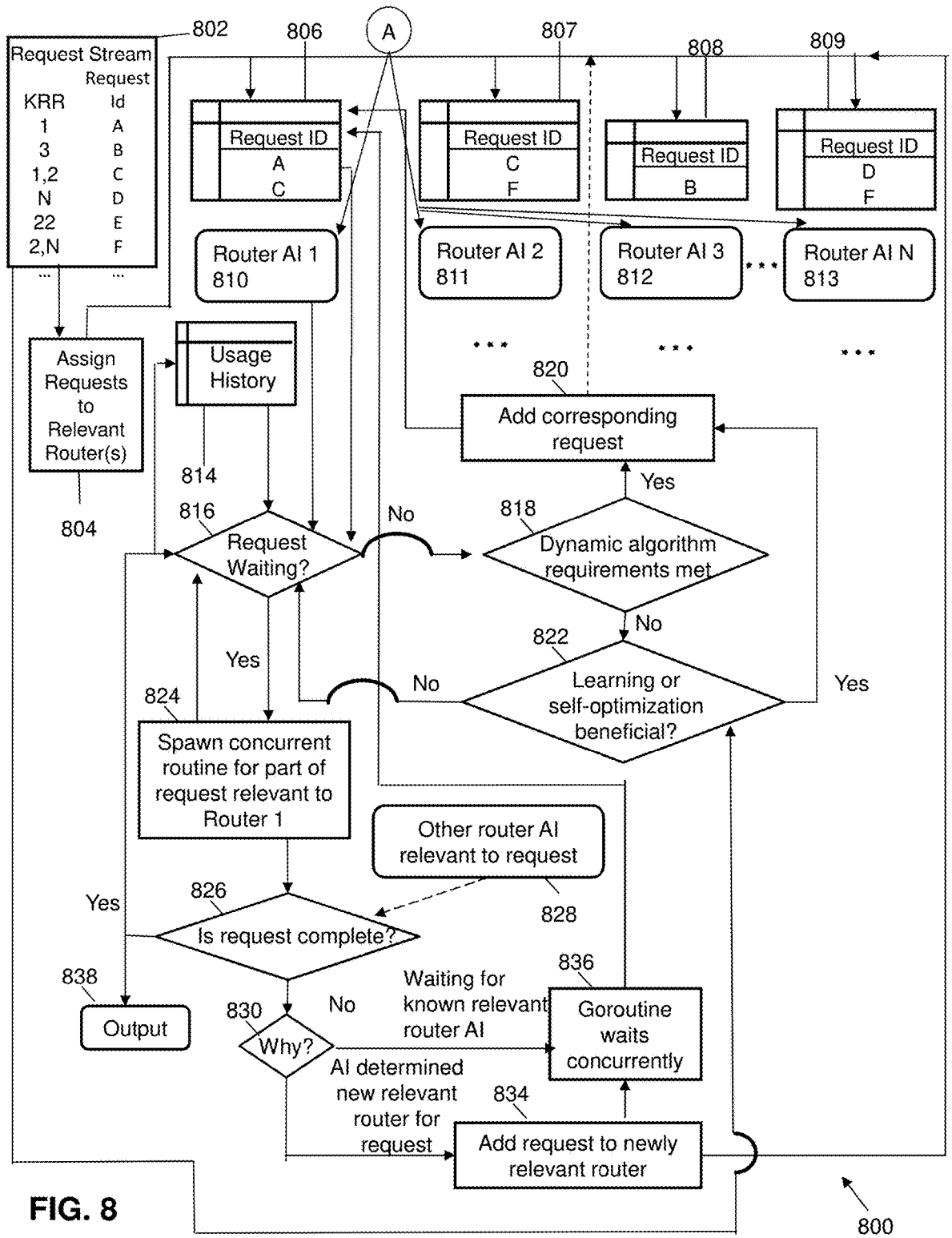
FIG. 8 is a flow diagram illustrating a sample method that describes macro-level logic of the system of FIG. 1.

As shown in FIG. 8, an exemplary method 800 for providing macro-level logic of the system 100 (i.e. the SmartGraph system) is schematically illustrated. The method 800 enables high levels of concurrent functionality, and steps of the method 800 may be performed in any desired order and are not limited to the order provided in the present disclosure. The method 800 is configured to enable the system 100 to perform useful operations, especially when computing resources of the system 100 allow. For example, the method 800 may be utilized by the system 100 to process many input requests (e.g. 806-809) from a request stream at the same time. The method 800 may also be configured to provide artificial-intelligence space (both literally and figuratively) to enable the system 100 and/or the agents to perform their own calculations, (e.g. determining if dynamic algorithm conditions are met, or performing learning (e.g. finding dynamic algorithms and their conditions)), or making self-improvements (via reorganizing data in the agents (i.e. routers), generating indices, changing agent representations (i.e. router representations), etc.) through knowledge of both past usage patterns, and upcoming requests (the SmartGraph may be an "online" graph database; we may assume that new requests may be constantly streaming in and being assigned). That is, even if no requests are currently assigned to a relevant agent (i.e. router), the artificial-intelligence functionality may be utilized to look into future requests (i.e. requests in the stream, but not yet assigned to relevant agents (i.e. routers)) to determine if there could be future savings if it performed optimization algorithms "now."

In FIG. 8, the set of three horizontal dots may indicate that many additional agents (i.e. routers) other than those explicitly shown may also be included in the method 800. The sets of three vertical dots in FIG. 8 may be utilized to show that the functionality of the method 800 may occur concurrently in any and all other agents (i.e. routers) as well. In method 800, concurrency may happen at three levels. At the first level, multiple machines (i.e. agents/routers) can execute concurrently, such as in certain distributed computing systems. The remaining two levels significantly relate to how the SmartGraph and the agent/router artificial-intelligence facilitate high throughput and efficiency, such as when processing requests from an input stream. In certain embodiments, each agent (i.e. router) may operate concurrently with other agents, even when multiple agents exist on a single thread within the same machine (e.g. database 155, servers 140, 150, 160, and/or any other device of system 100). It follows that the functionality provided by the method 800 and the system 100 may be even more efficient if each machine is configured to have multiple threads for running the agents. In certain embodiments, each agent (i.e. router) may spawn additional concurrent routines for processing requests, such as requests in the stream of requests. This is why there are two output arrows from the "spawn concurrent routine for part of request relevant to router 1" block 824 in FIG. 8. At 824, execution may concurrently split.

In method 800, when a request comes in for processing, the system 100 can determine which agents (i.e. routers) the request is relevant to. For example, the system 100 may store a list of vertices of interest, which may be stored in various agents. In certain embodiments, however, the artificial intelligence may also determine on the fly that additional agents may also have a role to play with regard to processing a request (e.g. if the request is to get neighbors of the vertices of interest, and some neighbors are contained in agents that have no vertices of interest). In such a case, the agent may "route" the appropriate request to an agent(s) of interest, and then begin performing another operation until the results of processing the request are ready and available. By separating graph database operation into multiple concurrent pieces that can self-determine when they need to cooperate to execute and process a request, the method 800 and system 100 allow for many more operations to be occurring simultaneously. As a result, this facilitates a higher utilization of processing power, more simultaneous users, and faster calculations when compared to existing technologies.

The method 800 may begin by receiving a stream of requests at step 802. In certain embodiments, the system 100 may analyze each of the requests in the stream of requests and may determine which request has relevance (e.g. a known request relevance (KRR)) to which specific artificially-intelligent agents (i.e. routers). For example, the system 100 may initially receive six requests, having Request Identifiers of A, B, C, D, E, and F, as shown in FIG. 8. The system 100 may determine, such as via any of the components of system 100, which agents 810-813 are relevant to each request and/or vice versa. Illustratively, in FIG. 8, request A is determined by the system 100 to be relevant to agent 810 (i.e. Router AI 1), request B is determined to be relevant to agent 812 (i.e. Router AI 3), request C is determined to be relevant to both agent 810 (i.e. Router AI 1) and agent 811 (i.e. Router AI 2), request D is determined to be relevant to an agent (i.e. Router AI 25; not explicitly shown) and agent 813 (i.e. Router AI N), request E is determined to be relevant to an agent (Router AI 22; not explicitly shown), and request F is determined to be relevant to agent 811 (Router AI 2) and agent 813 (Router AI N). The requests may be determined to be relevant to a particular agent based on the type of data associated with the request, based on the type of algorithm required to process the request, based on characteristics of each agent corresponding to one or more aspects of a request, based on any correlation with an agent, or combination thereof. In certain embodiments, the information obtained based on the determinations may be stored in a usage history 814, which may be configured to store the requests, information determined from the requests, the relevance between a request and an agent, a history of access patterns, a history of operation requests in the system 100, any other information of the system 100, or a combination thereof.

Once the relevance of the requests to specific agents are determined, the requests may be assigned to the appropriate relevant agent(s) (i.e. router) for handling and/or processing at step 804. In certain embodiments, the assigning of the request to the appropriate agents may be performed and/or facilitated by utilizing the first user device 102, the second user device 111, the server 140, the server 150, the database 155, the server 160, the communications network 135, any combination thereof, or by utilizing any other appropriate program, network, system, or device. The requests may be grouped into sets 806, 807, 808, 809 for processing by a particular agent. For example, set 806 includes requests A and C, all or a portion of which may be processed by agent 810 (i.e. Router AI 1). Similarly, set 807 includes requests C and F, all or a portion of which may be processed by agent 811 (i.e. Router AI 2), set 808 includes request B, all or a portion of which may be processed by agent 812 (i.e. Router AI 3), and set 809 includes requests D and F, all or a portion of which may be processed by agent 813 (i.e. Router AI N). At step 816, the method 800 may include determining if any previous requests are waiting to be processed and/or handled for each agent in addition to a new request. Illustratively, in FIG. 8, this is shown with respect to agent 810 (Router AI 1), but this may also be determined with respect to each and every other agent. In certain embodiments, the determining may be performed and/or facilitated by utilizing the first user device 102, the second user device 111, the server 140, the server 150, the database 155, the server 160, the communications network 135, any combination thereof, or by utilizing any other appropriate program, network, system, or device.

If at step 816, there are no previous requests waiting to be processed and/or handled by an agent (e.g. agent 810 in this example), the method 800 may proceed to step 818, which may include determining if dynamic algorithm requirements have been met. For example, the system may determine if the requirements of dynamic algorithms to be executed by one or more agents 810-813 have been met, such as based on an analysis of the request itself, whether data needed by the algorithm to process the request is available, whether processing and/or memory and/or other computing resources required by the algorithm are confirmed to be available, whether any other specified condition and/or requirement of an algorithm is met, or a combination thereof. If, at step 818, the dynamic algorithm requirements have been met (in this case requirements for agent 810), the specific current request may be added for processing and/or handling at step 820. Illustratively, for example, the request may be added to set 806 for processing by agent 810. The adding of the request may be performed and/or facilitated by utilizing the first user device 102, the second user device 111, the server 140, the server 150, the database 155, the server 160, the communications network 135, any combination thereof, or by utilizing any other appropriate program, network, system, or device. If, however, at step 818, the dynamic algorithm requirements have not been met, the method 800 may proceed to step 822, which may include determining if learning and/or self-optimization for an agent is beneficial for the agent. Further steps and functionality relating to the learning and/or self-optimization aspects are provided in detail in the discussion relating to FIG. 9. If, at step 822, learning and/or self-optimization are determined to be beneficial, the method may proceed to step 820, which may include adding the request for processing by an appropriate agent. On the other hand, if learning and/or self-optimization is determined to not be beneficial at step 822, the method 800 may proceed back to step 816 and continue accordingly.

If, at step 816, there is at least one previous request waiting to be processed and/or handled (i.e. by agent 810 in this example), the method 800 may proceed to step 824, which may include having the agent 810 spawn a concurrent routine to process the part of the request that is relevant to agent 810. In certain embodiments, the spawning of the concurrent routine may be performed by the agent itself and/or facilitated by utilizing the first user device 102, the second user device 111, the server 140, the server 150, the database 155, the server 160, the communications network 135, any combination thereof, or by utilizing any other appropriate program, network, system, or device. At step 826, the method 800 may determine if the processing and/or handling of the request has been completed. Additionally, at step 828, the method 800 may include determining if the artificial intelligence of other agents (e.g. agents 811-813) are relevant to the request. If the processing and/or handling of the request has not been completed, the method 800 may, at step 830, determine why the processing and/or handling has not been completed. For example, at step 830, the method 800 may include determining that the request has not been completed because the system 100 is waiting for a known relevant agent (e.g. agent 810) to process the request further. If so, the method 800 may proceed to step 836 and may add the request to a set of requests 806 for further processing by agent 810. At step 830, the method 800 may also include determining that other agents may be relevant to the request that has not been completed. If so, the method 800 may proceed to step 834, and may add the request (or the appropriate portion of the request) to the appropriate sets of the newly relevant agents (e.g. agents 811-813) for further processing by the newly relevant agents. The incomplete request may also be added to the set of requests for the agent 810 as well at step 836 if further processing of the request by agent 810 is desired. As an alternative to step 836 described above, instead of adding the request to a set of requests 806, the method 800, at step 826 may simply include waiting concurrently while the requests are completed (i.e. goroutine may wait concurrently while requests are completed). Once the request is determined to be completed at step 826, the method may proceed to step 838 and output the results of the processing of the request. In certain embodiments, the output produced based on processing the request may be stored in the usage history 814 and/or the method 800 may continue back to step 816 to determine if other requests are waiting to be processed and/or handled. Notably, the method 800 may incorporate any other functionality as described in the present disclosure.

Figure 9:
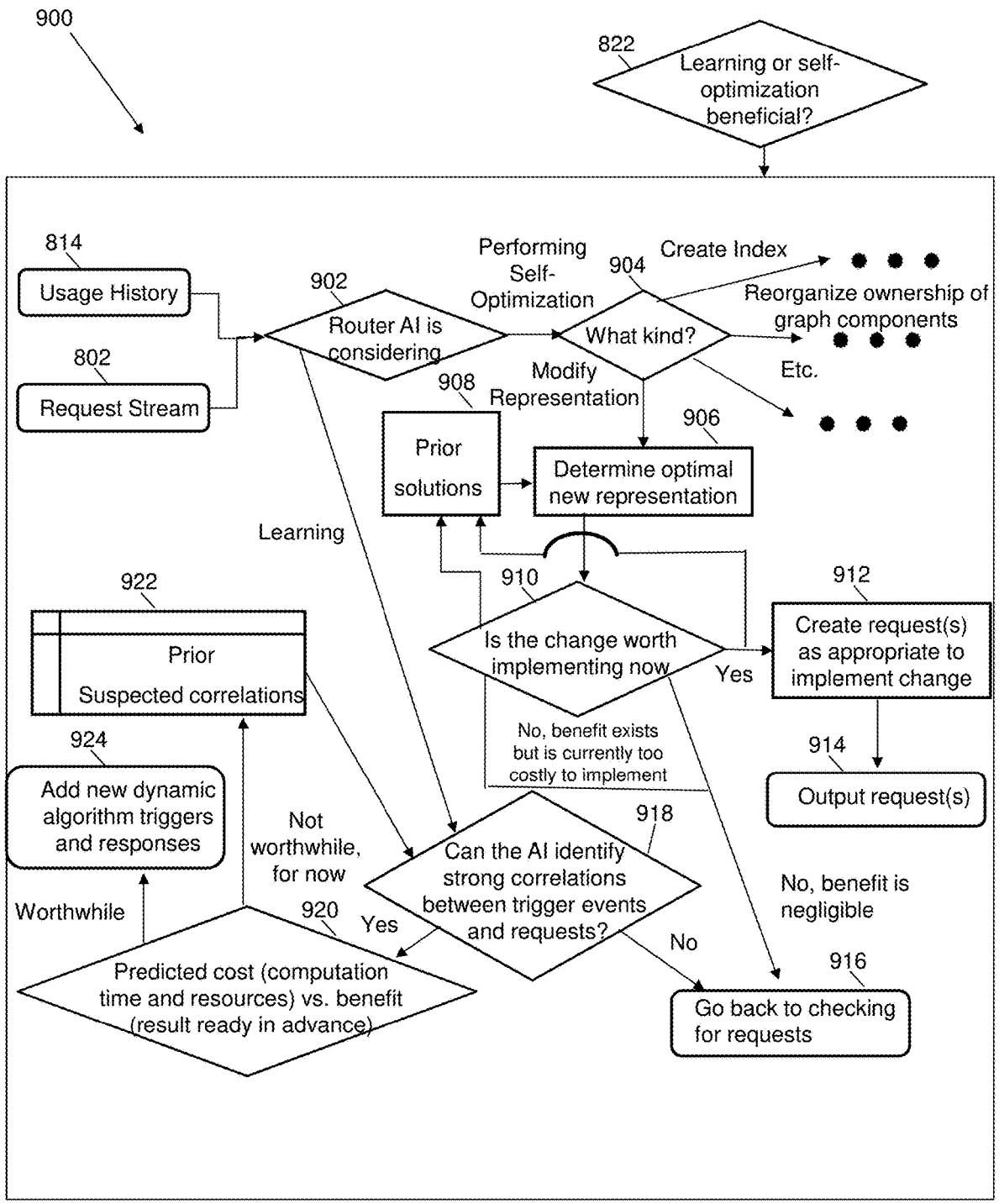
FIG. 9 is a flow diagram illustrating a sample method that provides learning and self-optimization according to an embodiment of the present disclosure.

Referring now also to FIG. 9, further details relating to step 822 are schematically illustrated in method 900. In FIG. 9, the method 900 provides further insight relating to the representation modification process chosen by the artificial intelligence of the system 100, such as the artificial intelligence resident within each agent 810-813. Notably, representation modification is not the only process the artificial intelligence can choose to perform, as indicate by the series of three dots after the "what kind" decision node 904. Method 900 also illustrates how the artificial intelligence may choose to search for correlations between trigger events (e.g. a financial transaction edge was added to the graph database (e.g. database 155) with a value over $100k) and subsequent requests (e.g. investigating the financial transaction for fraud by analyzing the transaction itself, the parties to the transactions, and the other behaviors of the parties to the transaction). In addition to being able to specify trigger event conditions and desired responses, the artificial intelligence, such as via method 900, can find such patterns itself, and choose to react as learned when such trigger events occur in the future. This capability is a key component of why the graph database as a whole is itself artificially intelligent.

At step 902 of the method 900, the method 900 may include having each agent 810-813 considering whether to perform self-optimization of itself. In certain embodiments, the method 900 may perform step 902 based on an analysis of the usage history 814 and/or by analyzing one or more requests of the stream of requests 802. In certain embodiments, the considering may be performed and/or facilitated by utilizing the first user device 102, the second user device 111, the server 140, the server 150, the database 155, the server 160, the communications network 135, any combination thereof, or by utilizing any other appropriate program, network, system, or device. If an agent desires to perform self-optimization in step 902, the method 900 may proceed to step 904, which may include determining what type of self-optimization needs to be performed for the agent. For example, the agent may determine that an index needs to be created, that ownership of graph components (or subgraph) needs to be reorganized, that a representation of a subgraph encapsulated by the agent needs to be modified, that any other type of optimization needs to be performed or a combination thereof. In certain embodiments, the determining may be performed and/or facilitated by utilizing the first user device 102, the second user device 111, the server 140, the server 150, the database 155, the server 160, the communications network 135, any combination thereof, or by utilizing any other appropriate program, network, system, or device.

At step 906, method 900 may determine a new optimal representation (i.e. graph representation) for the subgraph encapsulated by a particular agent if self-optimization for an agent is to be performed. The optimal representation may be determined from prior solutions 908 archived by the system 100, through information learned by each agent, by analyzing the database 155, and/or through any other information repository. At step 910, the method 900 may include determining if the change to the presentation is worth implementing now. If so, the method 900 may proceed to step 912 and create a request as appropriate to implement the change in the graph representation for the subgraph encapsulated by the agent. At step 914, the request may be outputted and processed so that the change to the representation is made. If, on the other hand, at step 910, it is not worth implementing the change in the representation for the subgraph encapsulated by the agent, the method 900 may proceed to step 916. For example, the method 900 may determine at step 910 that the change is not worth implementing now because, even though a benefit exists if the representation is changed, the amount of computing resources required to implement the change is above a threshold cost at the present time. As another example, the method 900 may determine at step 910 that the change to the representation is not worth implementing now because the benefit of making the change to the representation is negligible or nonexistent. If either condition exists, the method 900 may go back to checking for requests at step 916 to be processed and/or handled by the agents supporting the graph database.

At step 902, in addition to determining that self-optimization may need to be performed or may be desirable, it may also be determined that learning is desirable for the agent as well. If so, the method 900 may proceed to step 918, which may include having the artificial intelligence of the agent(s) identify correlations (e.g. a threshold correlation) between trigger events and requests (e.g. a sample trigger event may be that a financial transaction edge was added to the graph database with a value over $100k and a sample request may be to investigate the financial transaction for fraud by analyzing the transaction itself, the parties to the transactions, and the other behaviors of the parties to the transaction). If, at step 918, there is no threshold correlation between trigger events and requests, the method 900 may proceed to step 916 and continue checking for new requests. If, however, at step 918, there is a threshold correlation between a trigger event and a request, the method 900 may proceed to step 920, which may include determining the predicted cost (e.g. computation time and resources required to update algorithm triggers and responses based on the correlations) versus the benefit of having a result ready in advance. If, at step 920, the predicted cost is less than or potentially equal to the benefit, the method 900 may proceed to step 924 because it may be worthwhile to add new dynamic triggers and responses. At step 924, the method 900 may include adding new dynamic algorithm triggers and responses for the algorithms of the agent based on the correlations identified by the artificial intelligence of the agent between one or more trigger events and requests. This can be done so that as requests are entering the system 100, the requests may be processed using the increased learning of the agent and may be processed in a more optimal manner more quickly. If, however, the predicted cost is greater than the benefit, the method 900 may determine that it is not worthwhile to add new dynamic algorithm triggers and responses at the present time, and, instead, may utilize prior suspected correlations 922 between trigger events and requests when processing requests entering the system 100. Notably, the method 900 may incorporate any other functionality as described in the present disclosure.

Figure 10:
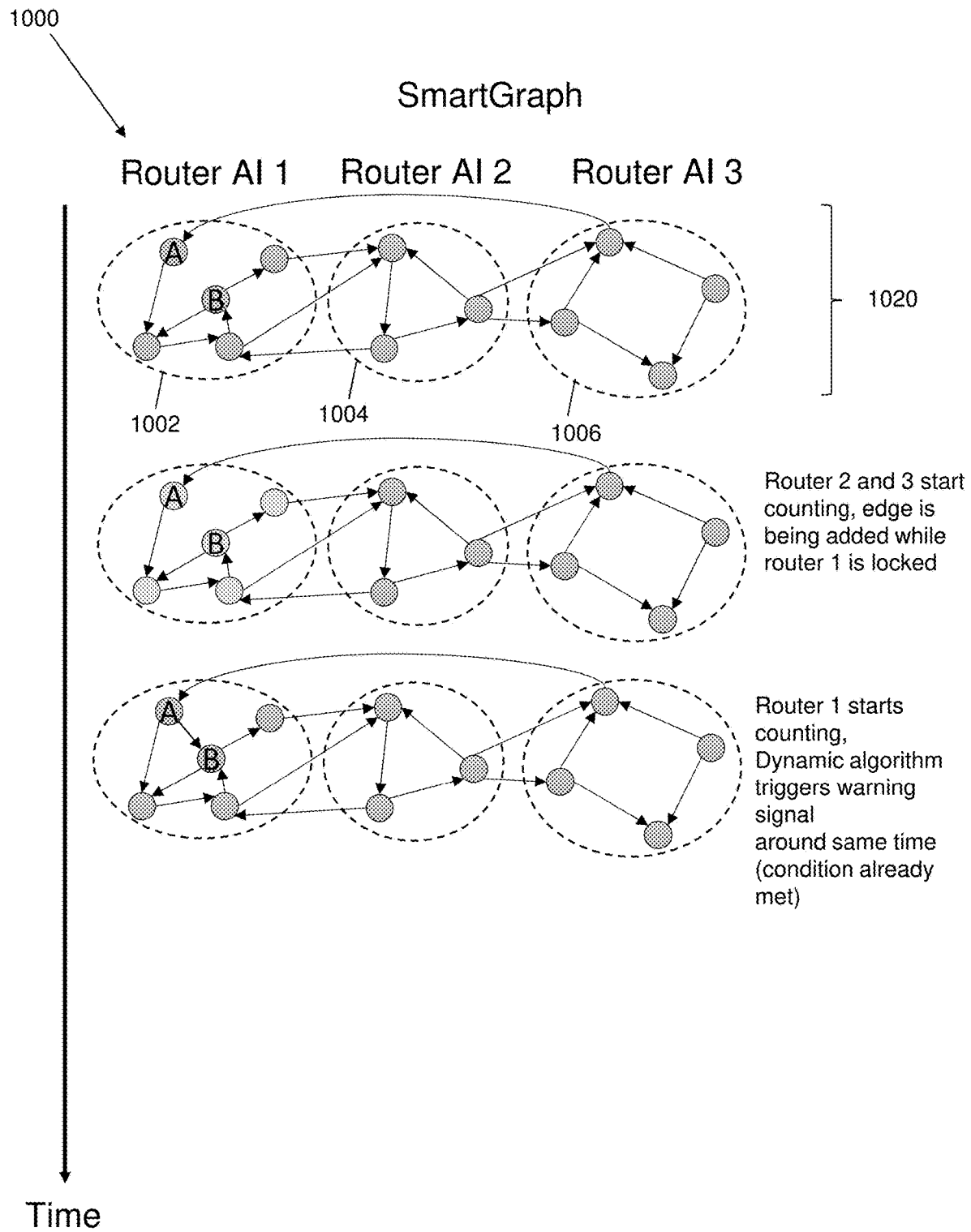
FIG. 10 is a schematic diagram illustrating router-specific locking and dynamic algorithms when adding an edge to a graph database according to an embodiment of the present disclosure.

Referring now also to FIG. 10, a schematic diagram illustrating router-specific locking and dynamic algorithms when adding an edge to a graph database 1000 using the functionality of the system 100 and methods of the present disclosure is shown. Additionally, referring now also to FIG. 11, a schematic diagram illustrating operation of a standard/traditional graph database 1100 when adding an edge is shown. For the purposes of the discussion relating to FIGS. 10 and 11, it may be assumed that there is a dynamic algorithm encoded within each graph database 1000, 1100 of each of the FIGS. 10 and 11 to send out a "warning signal" whenever a count is performed on the graph databases 1000, 1100 and there are more than six edges. In an example scenario, two requests may arrive at each of the graph databases 1000, 1100. The first request may be to add an edge between nodes A and B, and the second request may be to count all edges in the graphs 1020, 1120 of the graph database 1000, 1100. With regards to the graph database 1000 of FIG. 10, the first agent 1002 (Router AI 1) of the graph 1020 may be locked (e.g. locked to prevent any processing, editing, and/or other operation) while the first agent 1002 adds the edge between nodes A and B. This can be seen in FIG. 10 in the second depiction of the graph 1020 in FIG. 10, where the first agent 1002 encapsulating the first subgraph of the graph database 1000 is locked, and thus grayed out in FIG. 10. While the edge is being added between nodes A and B in the graph database 1020, the second agent 1004 (Router AI 2) and/or the third agent 1006 (Router AI 3) can process the request to count all the edges in the graph 1020 of the graph database 1000 within each of their subgraphs and/or in other portions of the graph 1020. Notably, this is also shown in the second depiction of the graph 1020 in FIG. 10. Once the edge is added, the first agent 1002 and the corresponding subgraph it controls is unlocked and the first agent 1002 begins counting the edges of its subgraph, as shown in the third depiction of the graph 1020 in FIG. 10. If the count of the edges is greater than six edges, the dynamic algorithm supporting the agents 1002, 1004, 1006 may trigger a warning signal because the condition for meeting at least six edges has been met.

Figure 11:
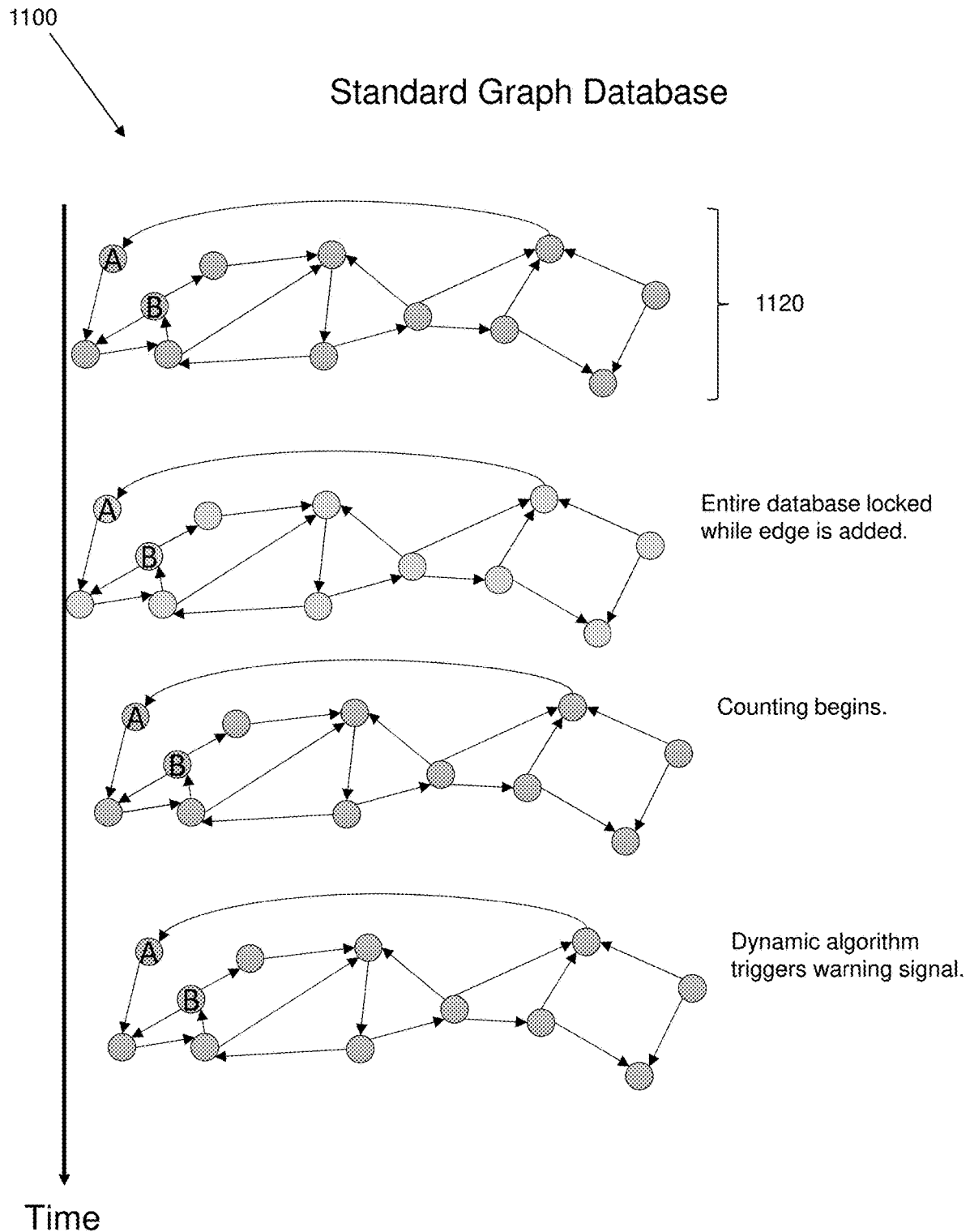
FIG. 11 is a schematic diagram illustrating operation of a standard graph database when an edge is added to the graph database.

In contrast, in FIG. 11, which features a standard graph database 1100, the entire graph database 1100 is locked while the edge is being added between nodes A and B for the graph 1120. This is shown in the second representation of the graph 1120 shown in FIG. 11. Notably, only after the edge is added between nodes A and B can the graph 1120 begin processing the request to count all edges in the graph database 1100. The counting of the edges begins only after the graph database 1100 is unlocked, as is shown in the third representation of the graph 1120 depicted in FIG. 11. The fourth representation of the graph 1120 depicts that since the condition for meeting at least six edges has been met, the dynamic algorithm supporting the functionality of the graph database 1100 causes a warning signal to be emitted. Based on the foregoing, it is evident that the standard graph database 1100 takes significantly more time (visually shown via the time axes on FIGS. 10 and 11) to reach the same outcome as the graph database 1000, which includes the functionality provided by the present disclosure. Additionally, the standard graph database 1100 is unable to multiple operations at once and must process requests one after the other. On the other hand, the graph database 1000 may process many requests simultaneously and is thus substantially more efficient. Notably, the graph database 1000 may incorporate any of the functionality provided by the system 100 and/or the methods described in the present disclosure.

Figure 12:
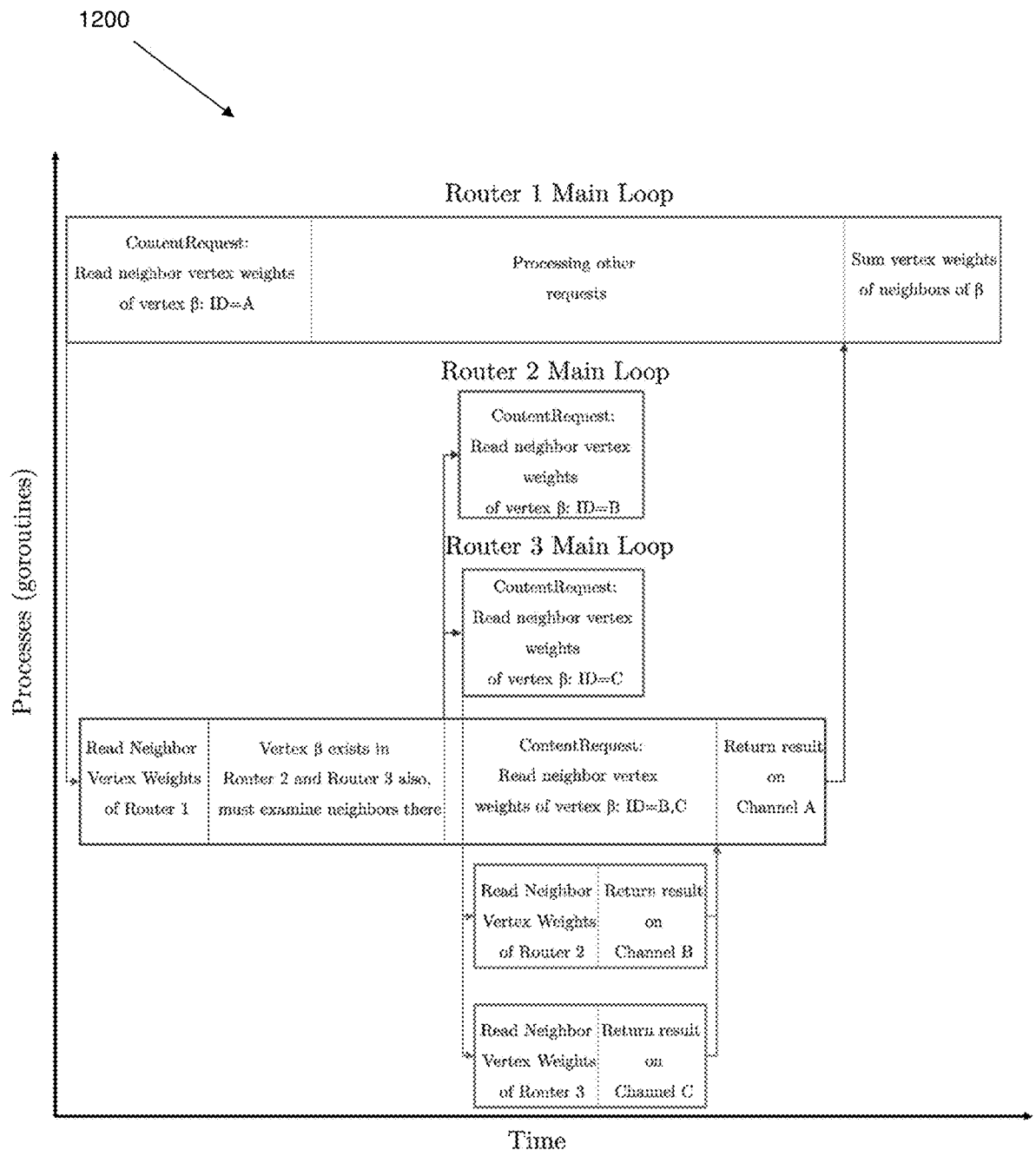
FIG. 12 is a schematic diagram illustrating the handling of requests through the use of goroutines and routers of the system of FIG. 1 according to an embodiment of the present disclosure.

Referring now also to FIGS. 8-9 and 12, further uses and description of the functionality of the system 100 is described. In particular, in FIG. 12, a diagram 1200 illustrating the handling of requests through the use of goroutines and routers of the system 100 according to an embodiment of the present disclosure is shown. Notably, a buffered channel is much like a regular channel (in that they may be used to send information between concurrent goroutines), except that they have buffers. This means that it is possible to put information onto a channel as long as there is space available, and possible to read from a buffered channel as long as there is something on the buffer. This is in contrast to non-buffered channels, where messages only propagate along the channel when a read and write occur at the same time (i.e. one is blocked until the other occurs). In certain embodiments, these buffered channels form an important part of the SmartGraph router system 100.

When a router is initialized, a goroutine and a corresponding channel may be created that together serve as an input to, and overall manager of, that router. When the router receives a request from "somewhere" (e.g. input by a user, hard-coded, created by a different router, and/or created by that router itself during a previous iteration) through the router channel (in the design of the system 100, router channels may always be considered inputs; for a router A to send a request to a different router B, it must send it through the channel corresponding to router B), the request is then placed on a buffer that is managed by the router goroutine. This buffer may then be processed in first-in first-out (FIFO) order by the central loop of each router object.

This central loop of the router goroutine determines the request type of the request read off of the buffer. Each request carries an information packet with the information relevant (and/or required) for the corresponding request type. The central loop may then spawn a new goroutine to execute the request and passes this information packet to the appropriate function (allowing the central loop to continue reading requests off of the buffer while the new goroutine processes the current request). Here we note that in FIGS. 8-9 this is simplified in that it has a separate "Request stream" and router level buffers. In reality, these systems may be one in the same, and the requests stream directly in at the router buffer level (however, as indicated by FIGS. 8-9, they are correctly targeted to the relevant router(s)).

In certain embodiments, there may be a number of important categories of requests. The most basic of these are requests that do not require any sort of acknowledgment or response, which can be casually executed without concern. More complicated are requests that require a signal (such as verification that adding some new graph structure has been completed) or data (such as the result of executing an analytic). These signals or response data messages may be the mechanism through which complicated algorithms consisting of many requests across many routers are executed.

This may be accomplished through a special request type called a ContentRequest, as is shown in FIG. 1200. A ContentRequest carries in its information packet another request, as well as a globally unique subchannel ID number (e.g. generated by a secure random number generator at the receipt of each message) and a channel capable of returning the type resulting from the internal request, which we refer to as the "return channel". Upon receiving a ContentRequest, the router stores into a map keyed by subchannel IDs the return channel, and then adds the internal request to its own buffer. This internal request is special, in that it may include the subchannel ID from the ContentRequest in its information packet. When this new internal request is executed by the router, the presence of the subchannel ID indicates to the router that the result of the internal request needs to be returned. In certain embodiments, the subchannel ID is used to key into the map of return channels, the appropriate channel found, and the result sent back upon it. While all of this is happening, the return channel may have been sent to another router B with instructions to read from that channel when possible and input the result along with a new request (i.e. a concurrent goroutine is created by router B to wait for the "return channel" to have something available; in this way, router B is free to continue processing available requests while it waits for the result of the original internal message to become available) into its own buffered channel of requests.

A simple example of this process is demonstrated in FIG. 12. In FIG. 12, Router 1 has received two dependent requests, in addition to many other unrelated requests. The boundaries within each process box represent when a new operation in a process is ready to begin (and thus the only assumption made about the completion time of the previous operation is that it is completed by the time the next process division is given). The first request is to read the vertex weights of the neighbors of node beta, and the second is to sum these weights. In this example, Router 1 creates a goroutine to read the neighbor weights of vertex beta in Router 1 (FIG. 12 is drawn so goroutine creation is drawn downward, and results are passed upward). While this is being executed, the created goroutines check and determine that vertex beta exists in Routers 2 and 3 also, and therefore neighbors in these Routers must also be checked. The goroutine created by Router 1 thus creates requests as appropriate and sends them to the corresponding routers, which in turn generate new goroutines to execute the requests and return the results. While this is all going on, Router 1 is free to process the other requests sent to its buffer.

It should be noted that FIG. 12 is a simplification in a number of ways. The most significant is that the SmartGraph system 100 actually may have a rule that routers only interact through requests, so when we "Return result on Channel B", we are actually sending a new request to Router 2 to send a request to Router 1 containing the result, which will then be combined with a similar process from Router 3 to allow the red goroutine (i.e. the fourth box in FIG. 12 from the top) to complete. This is part of the Content Return request type that will not be delved into beyond this description. As can be seen, even "simple" programs become extraordinarily complex in their execution patterns in the SmartGraph system 100. Fortunately, the mechanics of how the Buffered Channel Management is set up mean that the user does not need to know any of this; it is all automatically managed by the interactions between the routers and the subchannel identification system as described above.

It is this system 100 that facilitates the management of millions of concurrent operations with extraordinarily complex interdependencies. The SmartGraph system 100 also supports very complex requests: with requests in requests in requests, a single request on a single router generating multiple requests of different nature across multiple different routers of different type etc., but all of these more advanced requests may be built on the foundation of the ContentRequest. Thus, the system 100 is able to execute complex OLAP analytics using a transactional system inspired by OLTP graph databases. Consider that it is through thinking at the level of abstraction facilitated by green threads (last two bottom boxes in FIG. 12 when reviewing FIG. 12 from the top down) that this system 100 design is able to be conceptualized; the goroutines that manage each router routinely create new goroutines to execute each request, and may essentially forget about them (unless a subsequent message requests the result of a prior ContentRequest or the result is forcibly placed upon the buffer). In contrast, OS thread level concurrency management would involve manually running concurrent processes on a very small number of physical threads. It is clear from FIG. 12 that such manual management would essentially be impossible. This ability to think larger in terms of the number of threads (virtual though they may be) facilitates not only an effective concurrent process management system 100, but also leads to tangible performance benefits.

Figure 13:
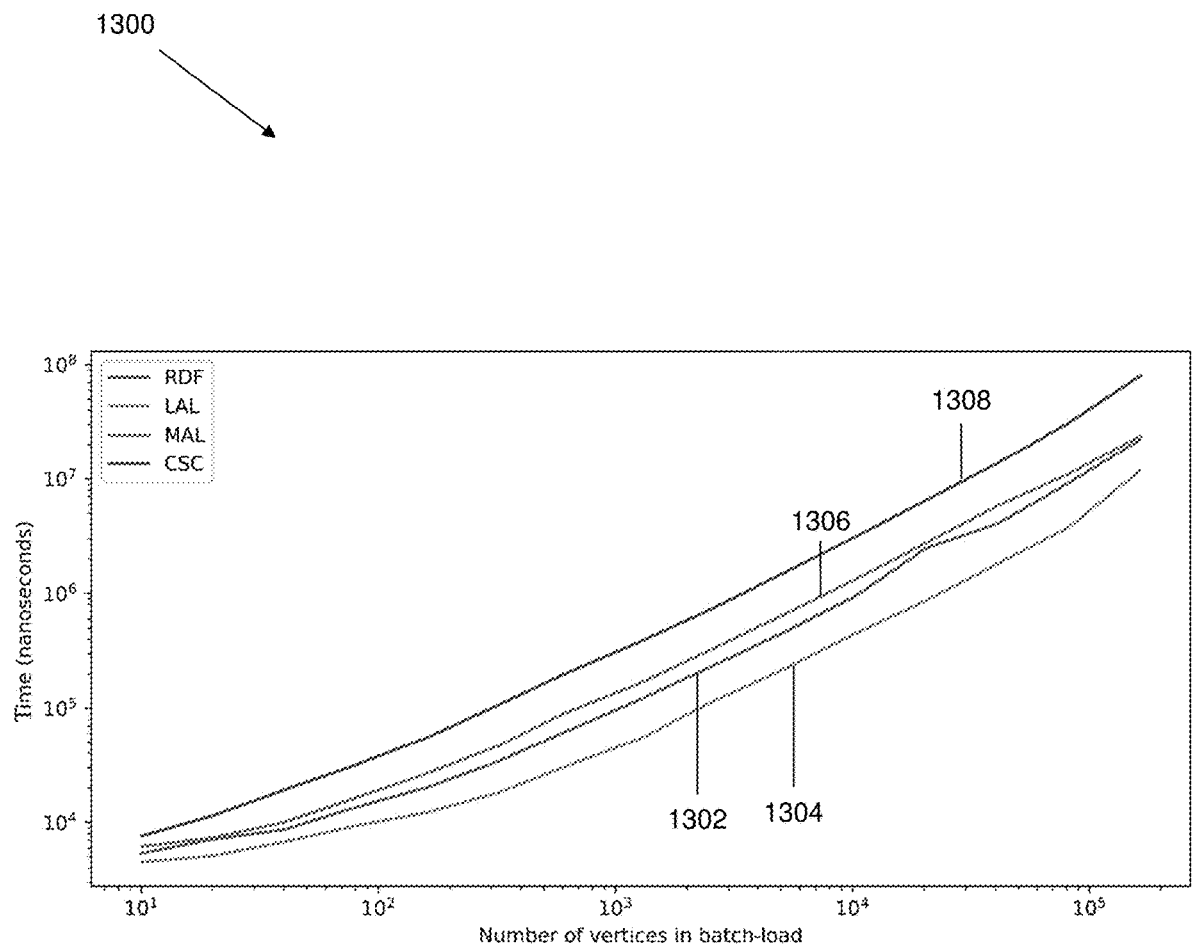
FIG. 13 is a graph illustrating the performance of different graph representations for use with the system of FIG. 1 in the context of a batch load scenario according to an embodiment of the present disclosure.

Referring now also to FIGS. 13-16, graphs 1300, 1400, 1500, and 1600 illustrate the performance of the system 100 in the context of various conditions and operations. For example, in FIG. 13, the visual graph 1300 illustrates the performance of the system 100 when using graph representations, such as a list of adjacently lists (LAL), RDF, matrix adjacency lists (MAL), and compressed sparse columns (CSC) with the system 100 in the context of batch loading of vertices. For this particular operation of batch loading, the visual graph 1300 illustrates the number of vertices in the batch load on the x-axis and time on the y-axis. As can be seen in FIG. 13, the graph line 1304 for the LAL illustrates the strongest performance; the graph line 1302 for the RDF representation is strong, but not as strong as LAL; the graph line 1306 for MAL illustrates performance that is slightly worse than RDF; and the graph line 1308 illustrates that CSC has the worst performance when compared to LAL, RDF, and MAL.

Figure 14:
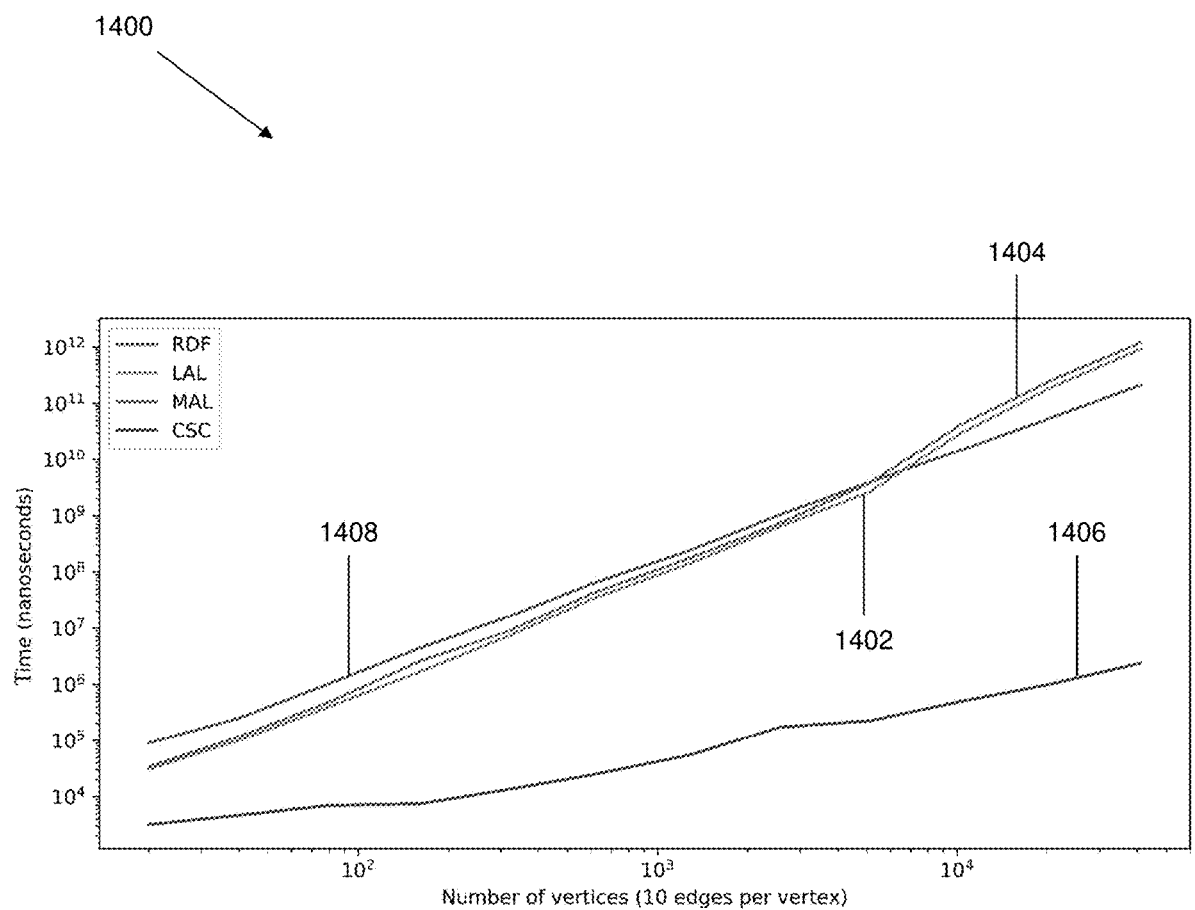
FIG. 14 is a graph illustrating the performance of different graph representations for use with the system of FIG. 1 in the context of inward exploration of edges according to an embodiment of the present disclosure.

As another example, in FIG. 14, the visual graph 1400 illustrates the performance of the system 100 when using graph representations, such as LAL, RDF, MAL, and CSC with the system 100 in the context of conducting the operation of inward exploration of edges (e.g. all edges) of a graph of the system 100. For this particular operation of inward exploration of edges, the visual graph 1400 illustrates the number of vertices on the x-axis and time on the y-axis. As can be seen in FIG. 14, the graph line 1406 for the CSC illustrates that CSC has the strongest performance because, among other reasons, CSC is focused on inbound stored data; the graph line 1402 for LAL shows that LAL has less performance than CSC, but has greater performance than MAL and has better or worse performance than RDF depending on the number of vertices; the graph line 1404 for MAL has slightly worse performance than LAL and has better or worse performance than RDF depending on the number of vertices; and the graph line 1408 for RDF illustrates that RDF has better or worse performance than LAL and MAL depending on the number of vertices.

Figure 15:
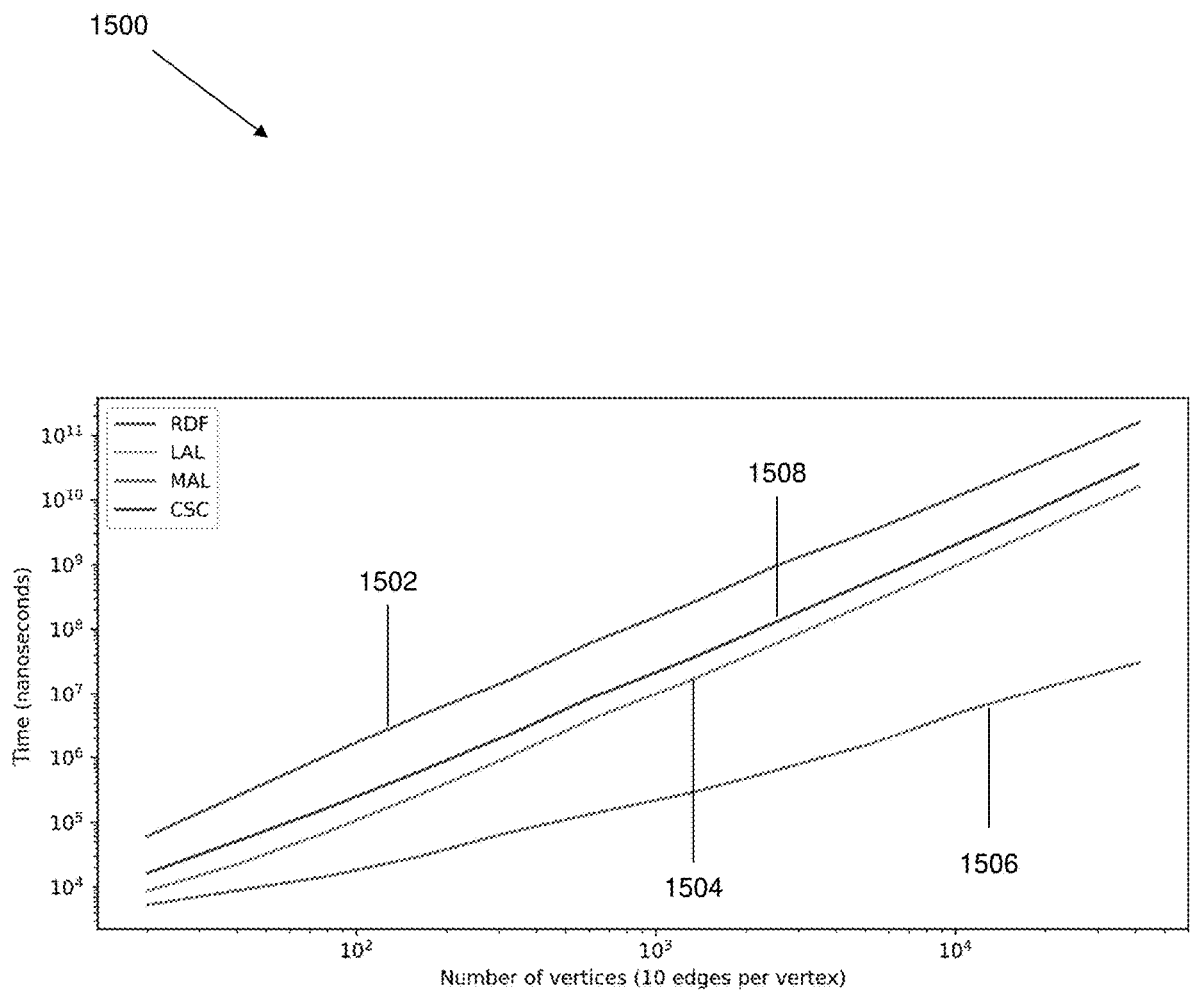
FIG. 15 is a graph illustrating the performance of different graph representations for use with the system of FIG. 1 in the context of outward exploration of edges according to an embodiment of the present disclosure.

As a further example, in FIG. 15, the visual graph 1500 illustrates the performance of the system 100 when using graph representations, such as LAL, RDF, MAL, and CSC with the system 100 in the context of conducting the operation of outward exploration of edges (e.g. all edges) of a graph of the system 100. For this particular operation of outward exploration of edges, the visual graph 1500 illustrates the number of vertices on the x-axis and time on the y-axis. As can be seen in FIG. 15, the graph line 1506 shows that the MAL representation has the strongest performance, the graph line 1504 for LAL shows that LAL has the second strongest performance, the graph line 1508 for CSC shows that CSC has the third strongest performance, and the graph line 1502 for RDF shows that RDF has the weakest performance in this context.

Figure 16:
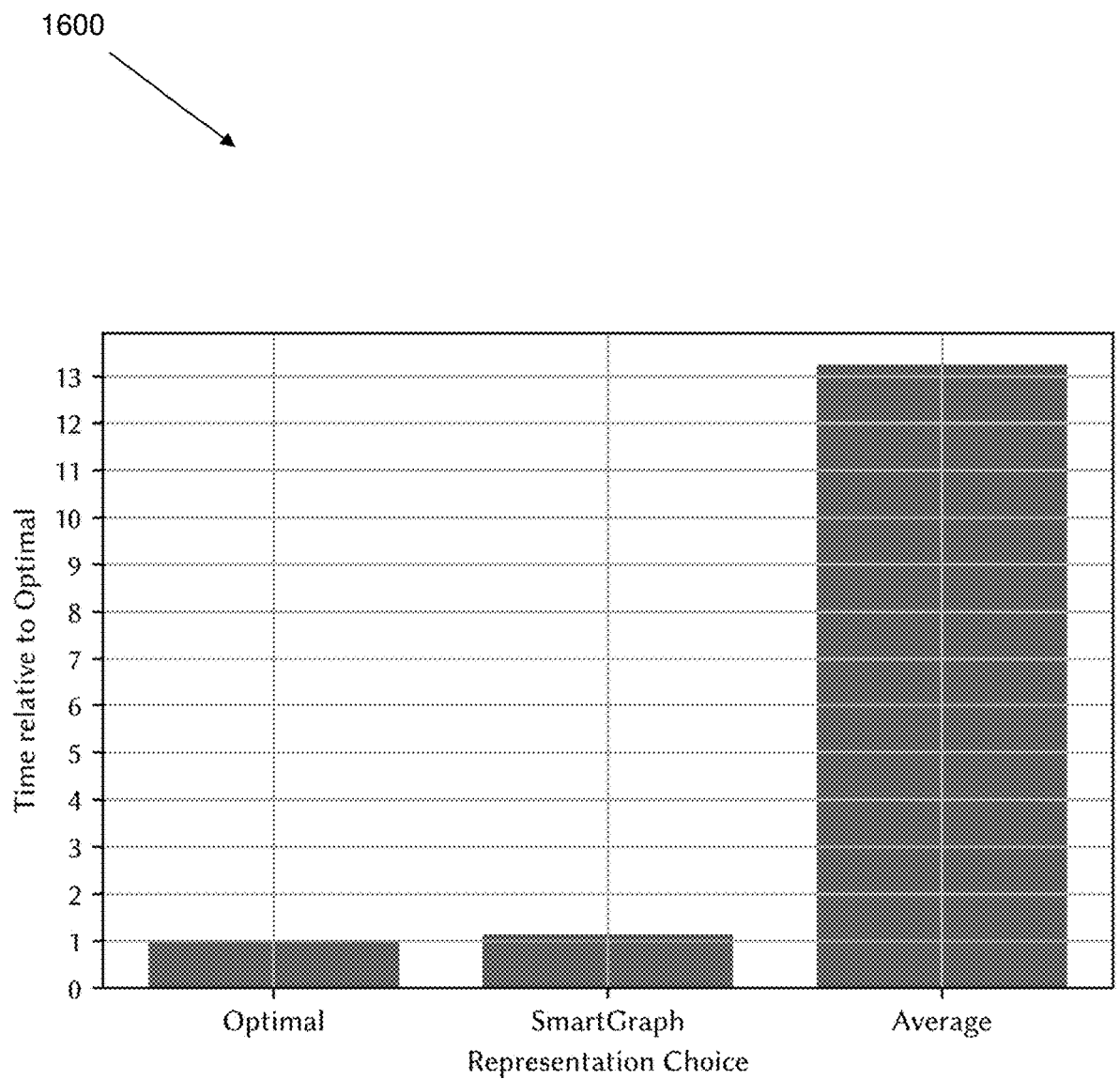
FIG. 16 is a chart illustrating the high performance of the system of FIG. 1 in comparison to choosing graph representations at random.

Referring now also to FIG. 16, a visual graph 1600 is shown. The visual graph 1600 illustrates the performance of the SmartGraph system 100 and methodologies. As is shown, the SmartGraph system 100 is approximately ten times faster than choosing a set of representations at random. The optimal scenario shown in the visual graph 1600 is only provided for comparison purposes. In particular, the optimal scenario would require trying every possible combination, which is a lot, and takes a lot of time, but once, found, that configuration would be the fastest. In comparison, the SmartGraph system 100, in embodiments, only needs to run once.

Figure 17:
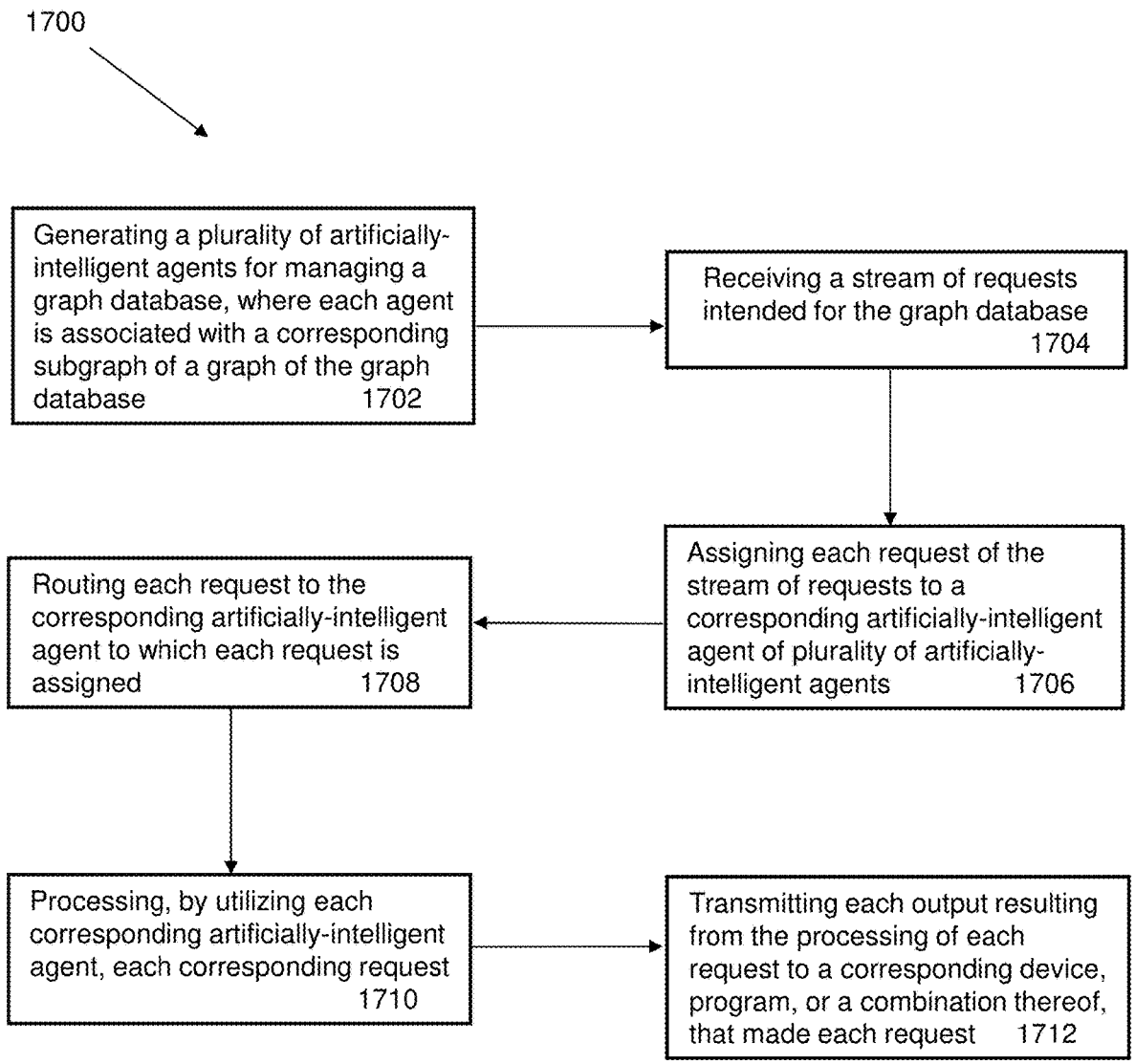
FIG. 17 is a flow diagram illustrating a sample method for providing an artificially-intelligent graph database according to an embodiment of the present disclosure.

As shown in FIG. 17, an exemplary method 1700 for providing an artificially-intelligent graph database is schematically illustrated. For the purposes of method 1700, a user, such as first user 101, or a device, such as first user device 102, may be interested in requesting information from the database 155, updating information in the database 155, removing and/or deleting information from the database 155, performing any operation with respect to the database 155, performing any other operation, or any combination thereof. At step 1702, the method 1700 may include generating one or more artificially-intelligent agents, which may be utilized to manage one or more portions (e.g. subgraphs or other portions) of a graph database of the database 155. In certain embodiments, the artificially-intelligent agents may comprise software, hardware, or a combination thereof, which may be utilized to process requests intended for a graph database of the database 155. In certain embodiments, the generating of the artificially-intelligent agents may be performed and/or facilitated by utilizing the first user device 102, the second user device 111, the server 140, the server 150, the server 160, the communications network 135, any combination thereof, or by utilizing any other appropriate program, network, system, or device. At step 1704, the method 1700 may include receiving a stream of requests intended for the graph database. For example, the requests in the stream of requests may be to edit the graph database, update the graph database, access information in the graph database, manipulate information in the graph database, add information to the graph database, perform any operation with respect to the graph database, or any combination thereof. In certain embodiments, the receiving of the stream of requests may be performed and/or facilitated by utilizing the first user device 102, the second user device 111, the server 140, the server 150, the server 160, the communications network 135, any combination thereof, or by utilizing any other appropriate program, network, system, or device.

At step 1706, the method 1700 may include assigning each request of the stream of requests to a corresponding artificially-intelligent agent of the plurality of artificially-intelligent agents. In certain embodiments, the assigning of a request to an artificially-intelligent agent may be based on a relevance of the request to the data in a subgraph managed by the artificially-intelligent agent, based on a relevance of the request to characteristics and/or features of the artificially-intelligent agent, based on any criteria, or based on any combination thereof. In certain embodiments, the assigning may be facilitated and/or performed by utilizing the first user device 102, the second user device 111, the server 140, the server 150, the server 160, the communications network 135, any combination thereof, or by utilizing any other appropriate program, network, system, or device. At step 1708, the method 1700 may include routing each request to the corresponding artificially-intelligent agent to which each request is assigned. In certain embodiments, the routing of each request may be performed and/or facilitated by utilizing the first user device 102, the second user device 111, the server 140, the server 150, the server 160, the communications network 135, any combination thereof, or by utilizing any other appropriate program, network, system, or device.

At step 1710, the method 1700 may include processing, by utilizing each corresponding artificially-intelligent agent, each corresponding request assigned to each corresponding artificially-intelligent agent. In certain embodiments, the processing may be facilitated and/or performed by utilizing the first user device 102, the second user device 111, the server 140, the server 150, the server 160, the communications network 135, any combination thereof, or by utilizing any other appropriate program, network, system, or device. At step 1712, the method 1700 may include transmitting each output resulting from the processing of each request to a corresponding device, program, or a combination thereof, which made each request. For example, if the first user 101 made the request by utilizing the first user device 102, the system 100 may transmit the output resulting from the processing of the request to the first user 101 by transmitting the output to the first user device 102 of the first user 101. In certain embodiments, the transmitting may be performed and/or facilitated by utilizing the first user device 102, the second user device 111, the server 140, the server 150, the server 160, the communications network 135, any combination thereof, or by utilizing any other appropriate program, network, system, or device. Notably, the method 1700 may further incorporate any of the features and functionality described for the system 100, any other method described herein, or as otherwise described herein.

The systems and methods disclosed herein may include further functionality and features. For example, the operative functions of the system 100 and methods may be configured to execute on a special-purpose processor specifically configured to carry out the operations provided by the system 100 and methods. Notably, the operative features and functionality provided by the system 100 and methods may increase the efficiency of computing devices that are being utilized to facilitate the functionality provided by the system 100 and methods. For example, the system 100 and methods can optimize the performance of future actions through machine learning, such as those conducted by the artificially-intelligent agents, such that a reduced amount of computer operations need to be performed by the devices in the system 100 using the processors and memories of the system 100 than in systems that are not capable of machine learning as described in this disclosure. In such a context, less processing power may need to be utilized because the processors and memories do not need to perform actions, operations, and analyses that have already been conducted by the system 100. As a result, the functionality provided by the system 100 and method 500 may provide substantial savings in the usage of computer resources by utilizing the software and functionality provided in the present disclosure.

Notably, in certain embodiments, various functions and features of the system 100 and methods may operate without human intervention and may be conducted entirely by computing devices, robots, programs, and/or processes. For example, in certain embodiments, multiple computing devices may interact with devices of the system 100 to provide the functionality supported by the system 100. Additionally, in certain embodiments, system 100 may operate continuously to reduce the possibility of defects, conflicts, and/or errors from being introduced into the system 100, the graph databases, and/or the artificially-intelligent agents (e.g. routers). In certain embodiments, the system 100 and methods may also provide effective computing resource management by utilizing the features and functions described in the present disclosure. For example, in certain embodiments, the system 100 may specify a quantity of computer processor resources (e.g. processor clock cycles, processor speed, processor cache, etc.) that may be dedicated to generating the artificially-intelligent agents; receiving streams of requests intended for components of the system 100 (e.g. database 155); assigning requests to the artificially-intelligent agents; routing the requests to the artificially-intelligent agents; processing the requests by utilizing the artificially-intelligent agents; generating outputs based on the processing of the requests; spawning concurrent routines for handling all or some of a request; conducting learning in the system 100; performing self-optimization for the artificially-intelligent agents; creating indices; determining optimal representations to utilize with the artificially-intelligent agents; adding dynamic algorithm triggers and/or responses; determining correlations between trigger events and/or requests; and performing any other operations conducted by the system 100, or any combination thereof. As another example, the system 100 may indicate a quantity of processor cycles of a processor that may be utilized to obtain data, process obtained data, and/or specify a selected amount of processing power that may be dedicated to editing the graph databases of the system 100, updating the graph databases of the system 100, obtaining data from the graph databases of the system 100, inputting data into the graph databases of the system 100, utilizing the artificially-intelligent agents of the system 100, performing any operation of the system 100 and/or methods described in the present disclosure, or a combination thereof.

In certain embodiments, any device or program in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and method 500 at time periods when usage of processing resources and/or memory resources in the system 100 is at a selected and/or threshold value. In certain embodiments, the system 100 and methods may include transmitting signals to the memory devices utilized in the system 100, which indicate which specific portions (e.g. memory sectors, etc.) of the memory should be utilized to store any of the data utilized or generated by the system 100 and/or the database 155. For example, a signal may be transmitted to the memory devices indicating which portions of the memories should be dedicated to storing data generated based on the processing of data by the artificially-intelligent agents, storing data learned by the system 100, storing algorithms utilized by the system 100, storing assignments of requests with the artificially-intelligent agents, storing any other information stored by the system 100, or a combination thereof. Notably, the signals transmitted to the processors and memories may be utilized to optimize the usage of computing resources while executing the operations conducted by the system 100. As a result, such features provide substantial operational efficiencies and improvements over existing technologies.

Figure 18:
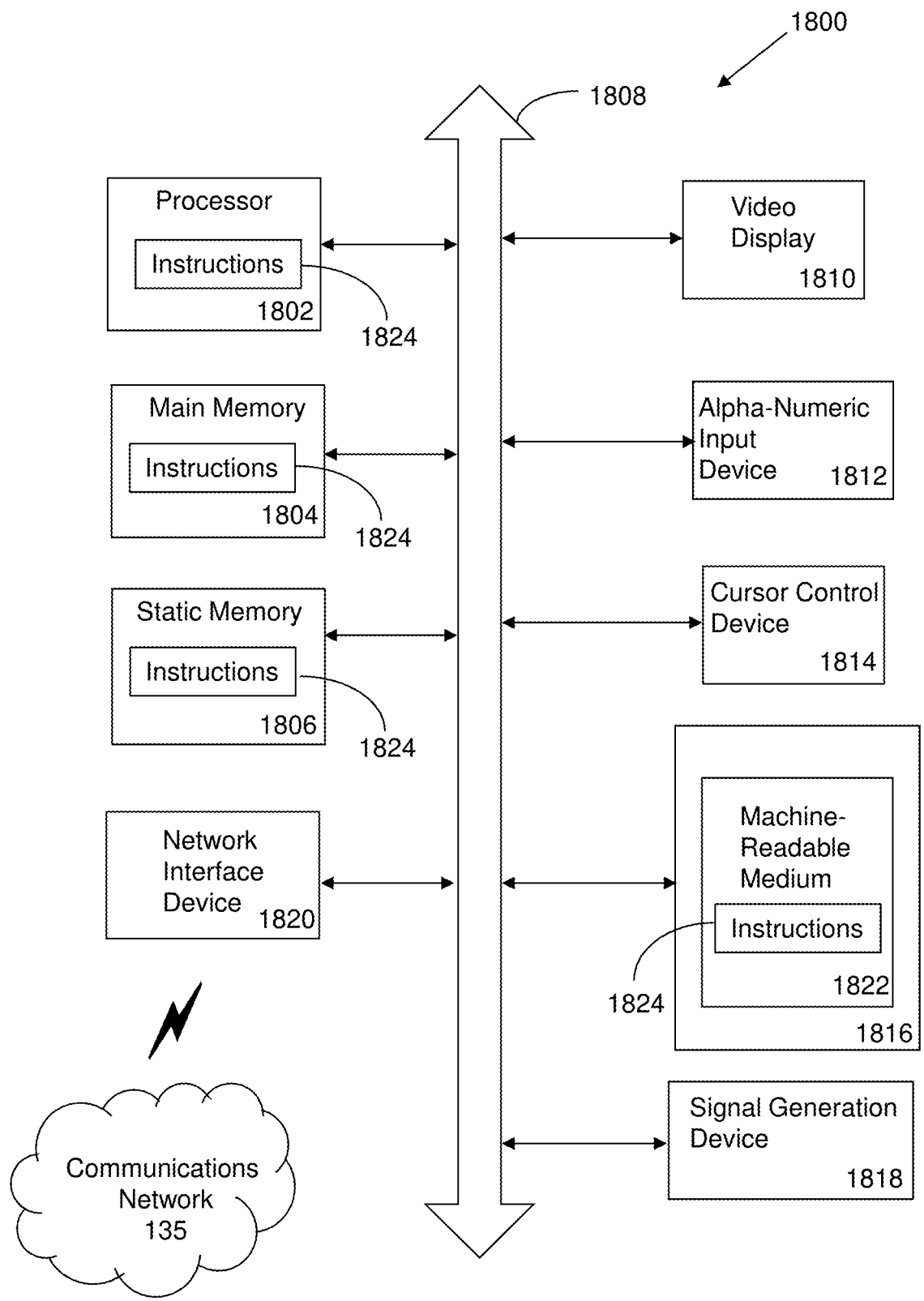
FIG. 18 is a schematic diagram of a machine in the form of a computer system within which a set of instructions, when executed, may cause the machine to perform any one or more of the methodologies or operations of the systems and methods for providing an artificially-intelligent graph database.

Referring now also to FIG. 18, at least a portion of the methodologies and techniques described with respect to the exemplary embodiments of the system 100 can incorporate a machine, such as, but not limited to, computer system 1800, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the server 150, the database 155, the server 160, or any combination thereof. The machine may assist with operations performed by the artificially-intelligent agents (e.g. routers), the graph databases provided in the present disclosure, any software application of the system 100, any other component in the system 100, any programs in the system 100, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1800 may include a processor 1802 (e.g., a central processing unit (CPU), a graphics processing unit (GPU, or both)), a main memory 1804 and a static memory 1806, which communicate with each other via a bus 1808. The computer system 1800 may further include a video display unit 1810, which may be, but is not limited to, a liquid crystal display (LCD), a flat panel, a solid state display, or a cathode ray tube (CRT). The computer system 1800 may include an input device 1812, such as, but not limited to, a keyboard, a cursor control device 1814, such as, but not limited to, a mouse, a disk drive unit 1816, a signal generation device 1818, such as, but not limited to, a speaker or remote control, and a network interface device 1820.

The disk drive unit 1816 may include a machine-readable medium 1822 on which is stored one or more sets of instructions 1824, such as, but not limited to, software embodying any one or more of the methodologies or functions described herein, including those methods illustrated above. The instructions 1824 may also reside, completely or at least partially, within the main memory 1804, the static memory 1806, or within the processor 1802, or a combination thereof, during execution thereof by the computer system 1800. The main memory 1804 and the processor 1802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1822 containing instructions 1824 so that a device connected to the communications network 135, another network, or a combination thereof, can send or receive voice, video or data, and communicate over the communications network 135, another network, or a combination thereof, using the instructions. The instructions 1824 may further be transmitted or received over the communications network 135, another network, or a combination thereof, via the network interface device 1820.

While the machine-readable medium 1822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions; and
a processor that executes the instructions to perform operations, the operations comprising:
generating a plurality of artificially-intelligent agents for managing a graph database, wherein each artificially-intelligent agent of the plurality of artificially intelligent-agents is associated with a corresponding subgraph of a graph of the graph database;
receiving a stream of requests intended for the graph database;
assigning each request of the stream of requests to a corresponding artificially-intelligent agent of the plurality of artificially-intelligent agents, wherein the assigning of each request to the artificially-intelligent agent is based on a relevance of each request to the artificially-intelligent agent;
routing each request to the corresponding artificially-intelligent agent to which each request is assigned;
processing, by utilizing the corresponding artificially-intelligent agent, each request, wherein the processing includes utilizing the corresponding artificially-intelligent agent to perform a computation on the corresponding subgraph of the graph of the graph database;
transmitting each output resulting from the processing of each request to a corresponding device, program, or a combination thereof, that made each request;
locking a first artificially-intelligent agent associated with a first subgraph of the graph database without locking other portions of the graph database;
updating the first artificially-intelligent agent while the first artificially-intelligent agent is locked and without locking the other portions of the graph database; and
following the update of the first artificially-intelligent agent, unlocking the first artificially-intelligent agent.

2. The system of claim 1, wherein the operations further comprise enabling a second artificially-intelligent agent of the plurality of artificially-intelligent agents to generate a local index based on pending requests of the stream of requests, based on a previous operation conducted by the second artificially-intelligent agent on a previous request received by the graph database, or a combination thereof.

3. The system of claim 1, wherein the operations further comprise determining if a second artificially-intelligent agent of the plurality of artificially-intelligent agents requests graph data from a second artificially-intelligent agent of the plurality of artificially-intelligent agents at a threshold frequency, and wherein the operations further comprise enabling the second artificially-intelligent agent to request ownership of the graph data of the second artificially-intelligent agent if the threshold frequency is satisfied.

4. The system of claim 1, wherein the operations further comprise enabling each artificially-intelligent agent of the plurality of artificially-intelligent agents to spawn a concurrent routine for processing one or more requests from the stream of requests.

5. The system of claim 1, wherein the operations further comprise determining whether processing of a first request of the stream of requests has been completed.

6. The system of claim 1, wherein the operations further comprise determining that in addition to a second artificially-intelligent agent of the plurality of artificially-intelligent agents that a third artificially-intelligent agent is needed to process a first request of the stream of requests, wherein the determining is based on an analysis conducted on the first request.

7. The system of claim 6, wherein the operations further comprise routing the first request of the stream of requests to the second artificially-intelligent agent so as to enable the second artificially-intelligent agent to cooperatively process the first request with the second artificially-intelligent agent.

8. The system of claim 1, wherein the operations further comprise enabling each artificially-intelligent agent of the plurality of artificially-intelligent agents to concurrently process each request in the stream of requests.

9. The system of claim 1, wherein the operations further comprise executing, by utilizing the plurality of artificially-intelligent agents, an algorithm on the graph database in response to a learn trigger, a user-specified trigger, or a combination thereof.

10. The system of claim 1, wherein the operations further comprise facilitating the creation of multiple different representations of parts of graph-structured data within each artificially-intelligent agent of the plurality of artificially-intelligent agents.

11. The system of claim 1, wherein the operations further comprise enabling each of the plurality of artificially-intelligent agents to operate on themselves based on a preset condition, based on a learned condition, or a combination thereof.

12. The system of claim 1, wherein the operations further comprise anticipating future requests from future streams of requests based on an access pattern, usage pattern, or a combination thereof, wherein the operations further comprise processing the anticipated future requests prior to an arrival of the anticipated future requests at the graph database.

13. A method, comprising:
providing a plurality of artificially-intelligent agents for managing a graph database, wherein each artificially-intelligent agent of the plurality of artificially intelligent-agents is associated with a corresponding subgraph of a graph of the graph database;
receiving a stream of requests intended for the graph database;
assigning, by utilizing instructions from a memory that are executed by a processor, each request of the stream of requests to a corresponding artificially-intelligent agent of the plurality of artificially-intelligent agents, wherein the assigning of each request to the artificially-intelligent agent is based on a relevance of each request to the artificially-intelligent agent;
providing each request to the corresponding artificially-intelligent agent to which each request is assigned;
processing, by utilizing the corresponding artificially-intelligent agent, each request, wherein the processing includes utilizing the corresponding artificially-intelligent agent to perform a computation on the corresponding subgraph of the graph of the graph database;
obtaining each output resulting from the processing of each request;
locking a first artificially-intelligent agent associated with a first subgraph of the graph database without locking other portions of the graph database;
updating the first artificially-intelligent agent while the first artificially-intelligent agent is locked and without locking the other portions of the graph database; and
following the update of the first artificially-intelligent agent, unlocking the first artificially-intelligent agent.

14. The method of claim 13, further comprising enabling each artificially-intelligent agent to perform self-optimization via creation of an index, reorganization of ownership of graph components, modification of representations of subgraphs of the graph of the graph database, or a combination thereof.

15. The method of claim 13, further comprising enabling each artificially-intelligent agent to select a storage format that matches a local connective structure, wherein the local connective structure corresponds to a relational structure of the corresponding subgraph associated with each artificially-intelligent agent.

16. The method of claim 13, further comprising splitting a second artificially-intelligent agent into multiple artificially-intelligent agents so as to allow for multiple representations of parts of graph structured data within the second artificially-intelligent agent.

17. The method of claim 13, further comprising enabling each artificially-intelligent agent of the plurality of artificially intelligent agents to analyze transactions as the transactions are added to the graph database, and further comprising scheduling and managing execution of an algorithm to be executed on at least one of the transactions in response to an event trigger.

18. The method of claim 17, further comprising generating an alert based on an output of the execution of the algorithm on the at least one of the transactions.

19. A non-transitory computer-readable device comprising instructions, which when loaded and executed by a processor, cause the processor to perform operations comprising:
providing a plurality of artificially-intelligent agents for managing a graph database, wherein each artificially-intelligent agent of the plurality of artificially intelligent-agents is associated with a corresponding subgraph of a graph of the graph database;
accessing a stream of requests intended for the graph database;
assigning each request of the stream of requests to a corresponding artificially-intelligent agent of the plurality of artificially-intelligent agents, wherein the assigning of each request to the artificially-intelligent agent is based on a relevance of each request to the artificially-intelligent agent;
sending each request to the corresponding artificially-intelligent agent to which each request is assigned;
processing, by utilizing the corresponding artificially-intelligent agent, each request to produce an output for each request, wherein the processing includes utilizing the corresponding artificially-intelligent agent to perform a computation on the corresponding subgraph of the graph of the graph database;
locking a first artificially-intelligent agent associated with a first subgraph of the graph database without locking other portions of the graph database;
updating the first artificially-intelligent agent while the first artificially-intelligent agent is locked and without locking the other portions of the graph database; and
following the update of the first artificially-intelligent agent, unlocking the first artificially-intelligent agent.

* * * * *